(12) United States Patent
Ishikawa et al.

(10) Patent No.: US 12,445,805 B2
(45) Date of Patent: Oct. 14, 2025

(54) INFORMATION PROCESSING METHOD, SYSTEM, AND PROCESSOR IN WHICH A FIRST MOBILE UNIT TRANSMITS RECORDED CONTENT TO A SECOND MOBILE UNIT BASED ON POSITIONS OF THE FIRST AND SECOND MOBILE UNITS

(71) Applicant: Panasonic Intellectual Property Management Co., Ltd., Osaka (JP)

(72) Inventors: Takeshi Ishikawa, Hyogo (JP); Youichirou Ueda, Osaka (JP); Takeshi Ando, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 586 days.

(21) Appl. No.: 17/813,034

(22) Filed: Jul. 16, 2022

(65) Prior Publication Data
US 2023/0033424 A1  Feb. 2, 2023

(30) Foreign Application Priority Data

Aug. 2, 2021 (JP) ................................. 2021-126680

(51) Int. Cl.
*H04W 4/029* (2018.01)
(52) U.S. Cl.
CPC .................. *H04W 4/029* (2018.02)
(58) Field of Classification Search
CPC ..... H04W 4/029; H04W 4/026; H04W 4/027; H04W 4/023
See application file for complete search history.

(56) References Cited

U.S. PATENT DOCUMENTS

| 10,744,048 | B2* | 8/2020 | Moore | A61G 5/128 |
| 2009/0195650 | A1* | 8/2009 | Hanai | G06T 19/006 |
| | | | | 382/284 |
| 2015/0192418 | A1 | 7/2015 | Shimada et al. | |
| 2016/0075278 | A1* | 3/2016 | Tsuzuki | H03G 3/20 |
| | | | | 340/463 |
| 2017/0266069 | A1* | 9/2017 | Lozano | A61G 5/04 |
| 2018/0218582 | A1* | 8/2018 | Hodge | H04N 21/44004 |
| 2019/0335241 | A1* | 10/2019 | Yamada | H04N 21/47217 |
| 2021/0170957 | A1 | 6/2021 | Sato et al. | |

FOREIGN PATENT DOCUMENTS

| JP | 2002-318129 | 10/2002 |
| JP | 2008-026007 | 2/2008 |
| JP | 2014-081574 | 5/2014 |
| JP | 2017-076204 | 4/2017 |
| JP | 2018-029290 | 2/2018 |
| JP | 2021-092839 | 6/2021 |

* cited by examiner

*Primary Examiner* — Brandon J Miller
(74) *Attorney, Agent, or Firm* — Wenderoth, Lind & Ponack, L.L.P.

(57) ABSTRACT

Provided is an information processing method that includes: acquiring record content recorded by a first mobile unit and first position information indicating a position of the first mobile unit while the record content is recorded; storing the first position information in association with the record content; and transmitting a part or all of the record content to a second mobile unit based on a distance between a position of the second mobile unit and the position of the first mobile unit indicated by the first position information.

12 Claims, 16 Drawing Sheets

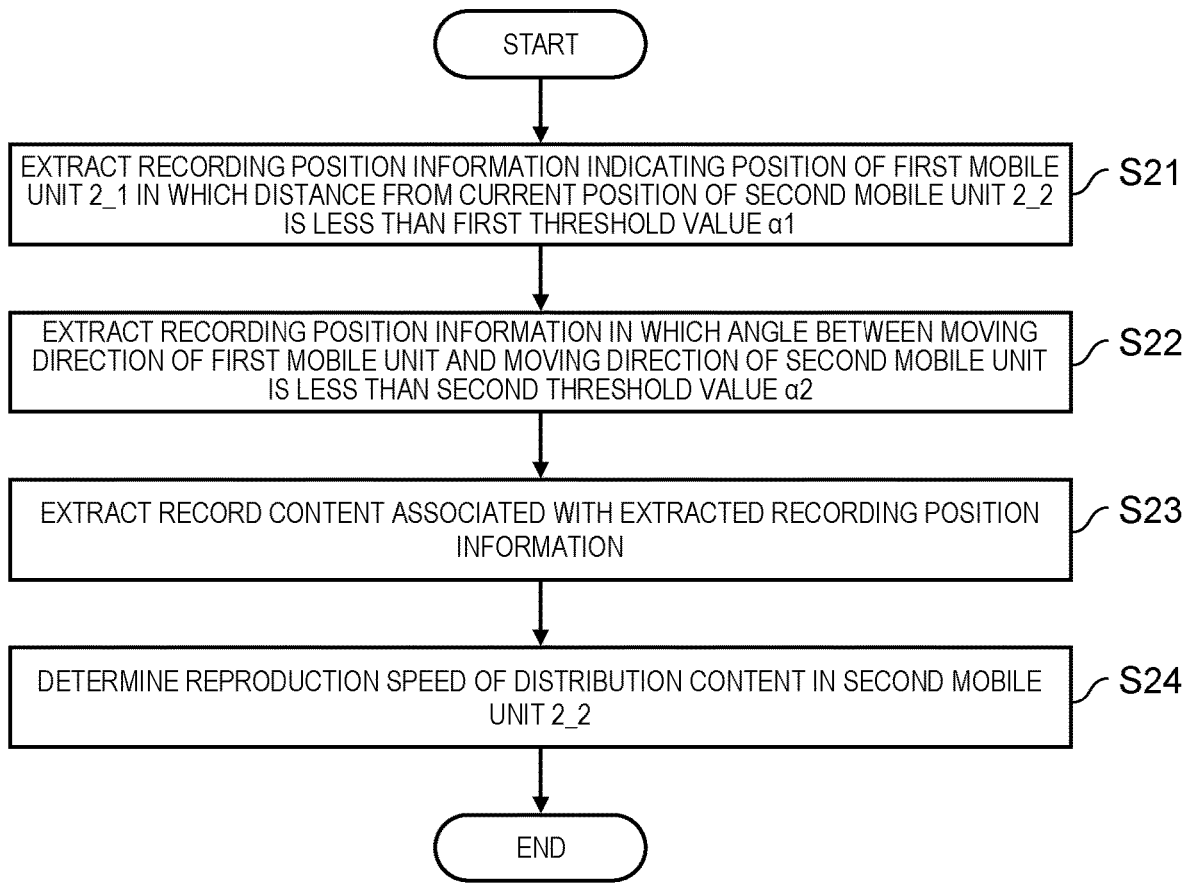

INFORMATION PROCESSING METHOD, SYSTEM, AND PROCESSOR IN WHICH A FIRST MOBILE UNIT TRANSMITS RECORDED CONTENT TO A SECOND MOBILE UNIT BASED ON POSITIONS OF THE FIRST AND SECOND MOBILE UNITS

BACKGROUND

1. Technical Field

The present disclosure relates to an information processing method, an information processing system, and an information processor related to reproduction of content in a mobile unit.

2. Description of the Related Art

There is a mobile unit capable of reproducing content while moving or stopping. For example, PTL 1 discloses a content distribution system that provides content such as music to be reproduced during driving of a vehicle in accordance with a point where the vehicle passes to a destination, a scheduled passing time, and the like.

CITATION LIST

Patent Literature

PTL 1: Unexamined Japanese Patent Publication No. 2017-76204

SUMMARY

An information processing method according to an aspect of the present disclosure includes: acquiring record content recorded by a first mobile unit and first position information indicating a position of the first mobile unit while the record content is recorded; storing the first position information in association with the record content; and transmitting a part or all of the record content to a second mobile unit based on a distance between a position of the second mobile unit and the position of the first mobile unit indicated by the first position information.

An information processing system according to an aspect of the present disclosure includes a first mobile unit that records record content, a second mobile unit, and an information processor. The information processor acquires the record content and first position information indicating a position of the first mobile unit while the record content is recorded, and stores the first position information in association with the record content, and then transmits a part or all of the record content to the second mobile unit based on a distance between a position of the second mobile unit and the position of the first mobile unit indicated in the first position information.

An information processor according to an aspect of the present disclosure includes a processor and a memory. The processor uses a program recorded in the memory to execute a procedure of acquiring record content recorded by a first mobile unit and first position information indicating a position of the first mobile unit while the record content is recorded, a procedure of storing the first position information in association with the record content, and a procedure of transmitting a part or all of the record content to a second mobile unit based on a distance between a position of the second mobile unit and the position of the first mobile unit indicated in the first position information.

BRIEF DESCRIPTION OF THE DRAWINGS

FIG. 23 is a flowchart for illustrating a method for determining distribution content and a method for determining reproduction speed of the distribution content.

DETAILED DESCRIPTIONS

There is a demand for providing multiple mobile units with content corresponding to points where the respective mobile units are located. The multiple mobile units each may move along a different time axis or move along a different route. In such a case, persons moving while being boarded in or moving along with to the respective multiple mobile units view respective different objects. This causes the persons moving while riding on or moving along with the respective multiple mobile units to be less likely to share the same experience.

An object of the present disclosure is to provide an information processing method, an information processing system, and an information processor, being capable of sharing an experience of a person riding on or moving along with a single mobile unit with a person riding on or moving along with another mobile unit.

Hereinafter, exemplary embodiments of the present disclosure will be described in detail with reference to the drawings. However, an unnecessarily detailed description such as detailed description of already well-known matters and duplicated description of substantially identical configuration will be sometimes eliminated. The following description and the drawings to be referred to are provided for those skilled in the art to understand the present disclosure, and are not intended to limit the scope of the claims of the present disclosure.

[Configuration]

<Information Processing System 100>

Figure 1:
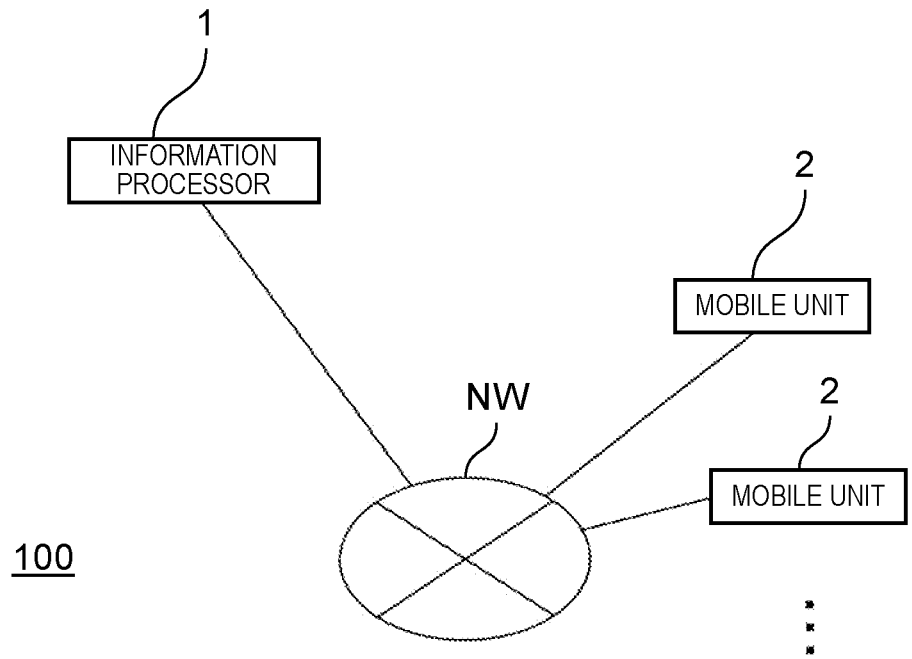
FIG. 1 is a diagram illustrating an example of a configuration of an information processing system.

First, a configuration of information processing system 100 according to an exemplary embodiment of the present disclosure will be described with reference to FIG. 1. As illustrated in FIG. 1, information processing system 100 includes information processor 1 and multiple mobile units 2.

Information processor 1 distributes content to multiple mobile units 2. Information processor 1 is, for example, a computer such as a personal computer (PC) or a workstation. FIG. 1 illustrates an example in which information processor 1 is communicatively connected to each of multiple mobile units 2 via network NW. Network NW is a communication network such as the Internet or an intranet. Although FIG. 1 illustrates the example in which information processor 1 is communicatively connected to multiple mobile units 2 via network NW, information processor 1 may be capable of directly communicating with multiple mobile units 2 without network NW.

Mobile unit 2 is a device capable of reproducing various kinds of content while moving. Examples of such mobile unit 2 include an electric wheelchair including a content reproduction device. Besides this, the examples may include various personal mobility or mobile means such as a mobile vehicle with a cabin. Mobile unit 2 moves under control of controller 26 described later and provided in mobile unit 2.

The present disclosure describes later mobile unit 2 that records content and that may be referred to as a "record mobile unit", and mobile unit 2 that reproduces the content and that may be referred to as a "reproduction mobile unit".

When multiple mobile units 2 travels in formation, and any one of multiple mobile units 2 (referred to below as a head mobile unit) moves, another mobile unit moves in order following the head mobile unit. When the mobile units travel in formation, the other mobile unit moves under control of controller 26 of the other mobile unit.

The head mobile unit during traveling in formation, or another mobile unit that does not travel in formation, performs automatic driving in which the mobile unit moves along a predetermined route under control of controller 26. Alternatively, the head mobile unit during traveling in formation, or another mobile unit that does not travel in formation, performs autonomous traveling in which an optimum route to an acquired destination is calculated and the mobile unit autonomously travels based on information acquired by a sensor. Alternatively, the head mobile unit during traveling in formation, or another mobile unit that does not travel in formation, is manually driven by a passenger or a remote operator.

The number of multiple mobile units 2 may be two, or three or more. When mobile units 2 are two in number, one of them corresponds to the head mobile unit described above, and the other corresponds to another mobile unit. When mobile units 2 are three or more in number, one of them corresponds to the head mobile unit, and remaining multiple mobile units each correspond to another mobile unit.

<Information Processor 1>

Figure 2:
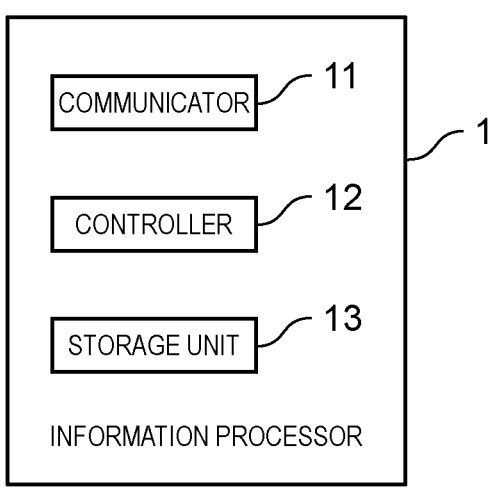
FIG. 2 is a block diagram illustrating an example of a configuration of an information processor.

Next, a configuration of information processor 1 will be described with reference to FIG. 2. Information processor 1 includes communicator 11, controller 12, and storage unit 13.

Communicator 11 is a communication device that communicates with multiple mobile units 2. Communicator 11 receives, for example, content recorded by any of multiple mobile units 2 and information such as a position of mobile unit 2. Communicator 11 also distributes content to mobile unit 2, for example. In the following description, content recorded by mobile unit 2 may be referred to as record content, and content distributed to mobile unit 2 may be referred to as distribution content.

Controller 12 is a processor including a central processing unit (CPU), a read only memory (ROM), and a random access memory (RAM), for example. Controller 12 reads out a program stored in the ROM, and develops the program in the RAM to provide content to multiple mobile units 2 according to the developed program. The RAM forms a work area in which various programs to be executed by the CPU and data related to the programs are temporarily stored. The ROM is composed of a nonvolatile memory or the like, and stores various programs and various data that are to be used for control.

Storage unit 13 includes a large-capacity recording medium such as a hard disk drive (HDD) or a solid state drive (SSD), and stores various types of information used for control of controller 12. Details of various types of information stored in storage unit 13 will be described later.

<Mobile Unit 2>

Figure 3:
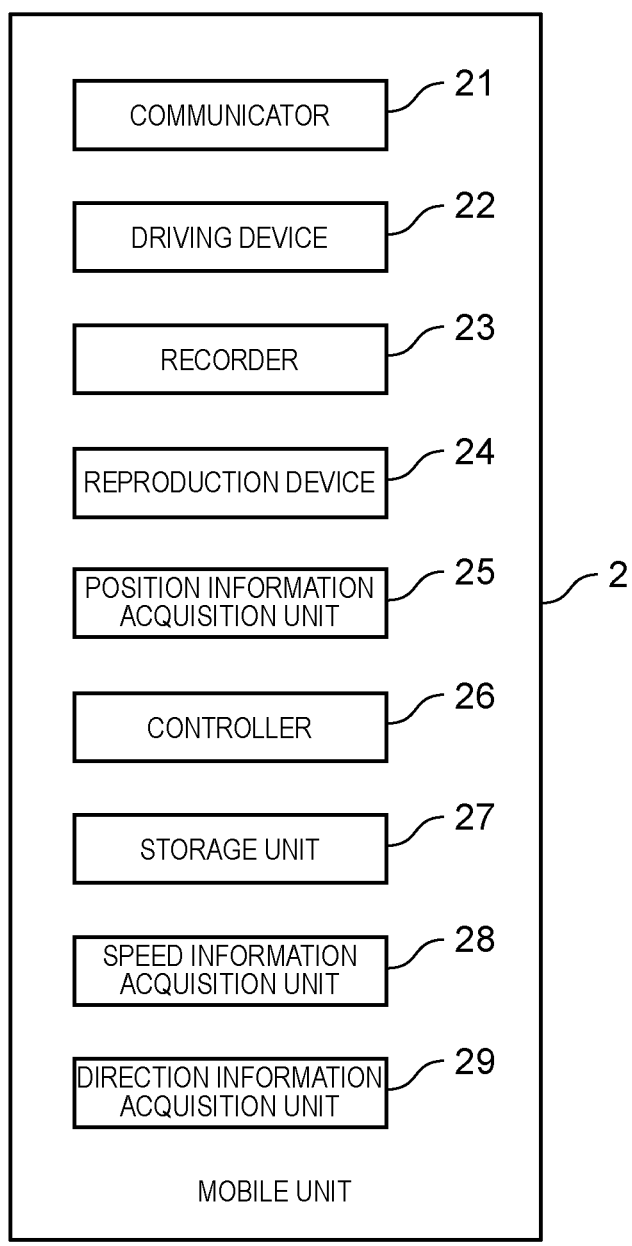
FIG. 3 is a block diagram illustrating an example of a configuration of a mobile unit.

Next, a configuration of mobile unit 2 will be described with reference to FIG. 3. Mobile unit 2 includes at least communicator 21, recorder 23, reproduction device 24, and controller 26. Mobile unit 2 further includes driving device 22, position information acquisition unit 25, storage unit 27, speed information acquisition unit 28, and direction information acquisition unit 29.

Communicator 21 is a communication device that communicates with information processor 1. Communicator 21 may be able to communicate with another mobile unit 2 via or without network NW. Communicator 21 communicates with information processor 1 or another mobile unit 2 in a wired or wireless manner.

Driving device 22 moves mobile unit 2. Driving device 22 moves mobile unit 2 by driving wheels, an infinite track, or the like with power of a motor, an engine, or the like, for example. Driving device 22 operates under control of controller 26.

Recorder 23 records content such as an image, a sound, and a comment. Recorder 23 is an input device such as a camera, a microphone, and a keyboard. When recorder 23 records an image, the recorded image may be either a still image or a moving image. Recorder 23 operates under control of controller 26. Data on the content recorded by recorder 23 may be stored in storage unit 27. In the following description, the data on the content may be simply referred to as content. Recorder 23 is not an essential component in the reproduction mobile unit.

Reproduction device 24 reproduces content. Reproduction device 24 can reproduce the distribution content distributed from information processor 1. Record content recorded by another mobile unit 2 is stored in information processor 1, and the distribution content is acquired from information processor 1 via communicator 21. Reproduction device 24 includes at least one of a display, a speaker, and an earphone, for example, and can reproduce at least one of an image and a sound. Reproduction device 24 operates under control of controller 26. Alternatively, reproduction device 24 may operate under control of controller 12 of information processor 1. Reproduction device 24 is not an essential component in the record mobile unit.

Position information acquisition unit 25 acquires information indicating a position of mobile unit 2 as position information. For example, when mobile unit 2 performs automatic driving in which mobile unit 2 moves along a predetermined route, information indicating details of the predetermined route may be stored in storage unit 27.

For example, the position information indicates a point where mobile unit 2 is located among specific points set in advance in the predetermined route. When mobile unit 2 is located between two different points, the position information indicates points between which mobile unit 2 is located.

As a method for acquiring position information with position information acquisition unit 25, a known method can be adopted. Examples of the known method include a first method for specifying a position based on radio waves obtained from multiple beacons installed at respective specific points. The examples include a second method for specifying a position based on a global positioning system (GPS) signal received from a GPS satellite. The examples include a third method in which a shape and a position of a stored object disposed in a predetermined route are stored in advance, and a position of a mobile unit is specified by checking surrounding environment information recognized by a camera or a sensor such as a light detection and ranging (LiDAR) sensor against the shape and position of the stored object. The examples include a fourth method for specifying a current position by calculating a movement distance and a moving direction from a known point with odometry or the like.

Speed information acquisition unit 28 generates speed information on speed of mobile unit 2. Speed information acquisition unit 28 generates speed information on mobile unit 2 based on a position of mobile unit 2 acquired by position information acquisition unit 25 and a temporal change in position of mobile unit 2, for example. Alternatively, speed information acquisition unit 28 may generate the speed information on mobile unit 2 by integrating acceleration of mobile unit 2 acquired using an accelerometer. Alternatively, speed information acquisition unit 28 may generate the speed information on mobile unit 2 based on rotation speed of a wheel of mobile unit 2. Additionally, speed information acquisition unit 28 may generate the speed information on mobile unit 2 by using a laser Doppler velocimeter, for example.

Direction information acquisition unit 29 generates direction information on a moving direction of mobile unit 2. Direction information acquisition unit 29 generates direction information on mobile unit 2 based on a position of mobile unit 2 acquired by position information acquisition unit 25 and a temporal change in position of mobile unit 2, for example. Alternatively, direction information acquisition unit 29 may generate the direction information on mobile unit 2 based on a difference in rotation speed of each wheel of mobile unit 2.

Controller 26 is a processor including a CPU, a ROM, and a RAM, for example. Controller 26 reads out a program stored in the ROM, develops the program in the RAM to control recorder 23 and reproduction device 24 according to the developed program. The RAM forms a work area in which various programs to be executed by the CPU and data related to the programs are temporarily stored. The ROM is composed of a nonvolatile memory or the like, and stores various programs and various data that are to be used for control.

Controller 26 controls driving device 22 to move mobile unit 2. The movement of mobile unit 2 caused by controller 26 may be either the traveling in formation or the autonomous traveling described above. Additionally, mobile unit 2 may be moved by either automatic driving under control of controller 26 or manual driving operated by a passenger or a remote operator.

During the traveling in formation, mobile unit 2 moves along a travel route of a forward mobile unit while maintaining a constant interval from the forward mobile unit by recognizing a position of the forward mobile unit under control of controller 26. For manual driving, mobile unit 2 may be moved by using an input device such as a joystick, a steering wheel, or a remote controller, under control of controller 26, or may be moved by manual pressing caused by an assistant without using controller 26.

Controller 26 also controls recorder 23 to record content. The content is recorded based on an instruction input by the passenger of mobile unit 2 using an input device or the like, for example. Besides this, the content may be recorded based on an instruction of information processor 1, for example.

Controller 26 controls reproduction device 24 to reproduce distribution content distributed from information processor 1. The distribution content is automatically reproduced based on an instruction from controller 26 or information processor 1 in accordance with position information on mobile unit 2, for example. Besides this, the distribution content may be reproduced based on an instruction input by the passenger of mobile unit 2, for example.

Storage unit 27 includes a large-capacity recording medium such as an HDD or an SSD. Storage unit 27 stores information on a predetermined route along which mobile unit 2 moves, map information on a movement range of mobile unit 2, data on record content recorded by recorder 23, related data on the record content, and the like. The related data on the record content includes recording position information indicating a position at which mobile unit 2 has recorded, recording speed information indicating moving speed when mobile unit 2 has recorded, recording direction information indicating a moving direction when mobile unit 2 has recorded, time information to be described later, and the like. When including no storage unit 27, mobile unit 2 may directly transmit record content recorded by recorder 23 to information processor 1.

Alternatively, storage unit 27 may store data on distribution content recorded by another mobile unit 2 and distributed via information processor 1, and its related data. When including no storage unit 27, mobile unit 2 may reproduce the distribution content by streaming reproduction via information processor 1.

Storage unit 27 stores the data that varies depending on whether mobile unit 2 is the record mobile unit or the reproduction mobile unit described above. Details of the data stored in storage unit 27 will be described later.

Figure 4A:
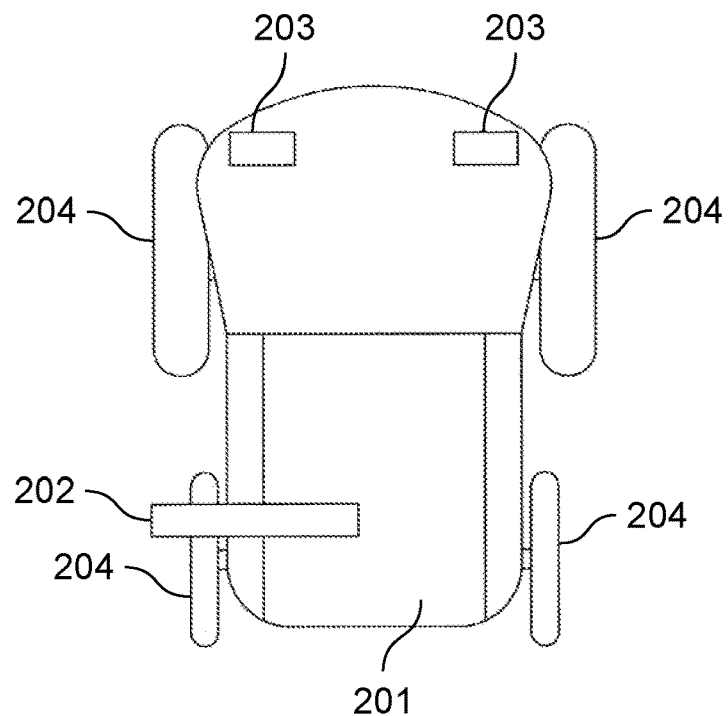
FIG. 4A is a schematic diagram illustrating an example of an external appearance of a mobile unit.
Figure 4B:
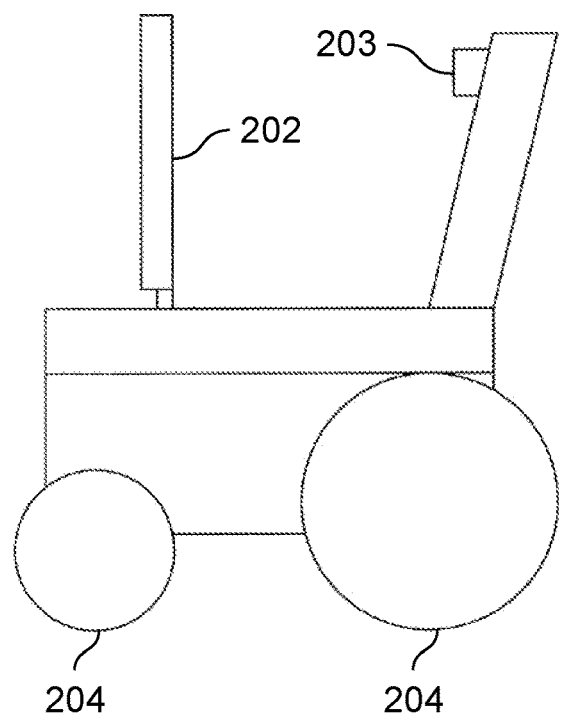
FIG. 4B is a schematic diagram illustrating an example of an external appearance of a mobile unit.

FIGS. 4A and 4B are each a schematic diagram illustrating an example of an external appearance of mobile unit 2. FIG. 4A is a top view of mobile unit 2, and FIG. 4B is a side view of mobile unit 2. FIGS. 4A and 4B each illustrate the example in which mobile unit 2 is an electric wheelchair, and includes seat 201, display 202, and speaker 203. This configuration enables a passenger sitting on seat 201 to view an image displayed on display 202 and listen to a reproduced sound from speaker 203.

FIG. 4A illustrates the example in which display 202 is configured to cover about half of the field of view of the passenger. This configuration enables the passenger to simultaneously view a landscape through display 202 and an image displayed on display 202. Display 202 may be a transparent or translucent transmissive display. This configuration enables the passenger to view the image displayed on display 202 and the landscape through display 202 in a superimposed manner. When display 202 is a transmissive display, display 202 may cover almost the entire field of view of the passenger instead of about a half of the field of view. Display 202 may display a real-time surrounding landscape captured by a camera provided in mobile unit 2 and the distribution content in a superimposed manner. This case enables the passenger to enjoy the distribution content while visually recognizing the front in a moving direction, for example, and to obtain a content experience with high safety and immersive feeling.

FIGS. 4A and 4B each illustrate the example in which mobile unit 2 includes multiple wheels 204. At least some of wheels 204 are driven by driving device 22 (see FIG. 3), so that mobile unit 2 can move.

[Operation]

Hereinafter, operation of information processing system 100 will be described with reference to FIGS. 5 to 23. In the following description, a traveling method of mobile units is assumed such that a head mobile unit travels by automatic driving in which the mobile unit moves along a predetermined route under control of controller 26, and another mobile unit located behind travels by manual driving operated by a passenger while following the head mobile unit. Although as described above, the traveling method of the mobile unit includes autonomous traveling other than the traveling in formation, the operation of information processing system 100 is common even in the autonomous traveling.

In the following description, information processing system 100 includes multiple mobile units 2 in which a record mobile unit that records content is referred to as first mobile unit 2_1 serving as a head mobile unit, and a reproduction mobile unit that reproduces record content recorded by first mobile unit 2_1 is referred to as second mobile unit 2_2 serving as another mobile unit. The record mobile unit is not limited to the head record mobile unit, and the reproduction mobile unit is not limited to the other mobile unit.

Figure 5:
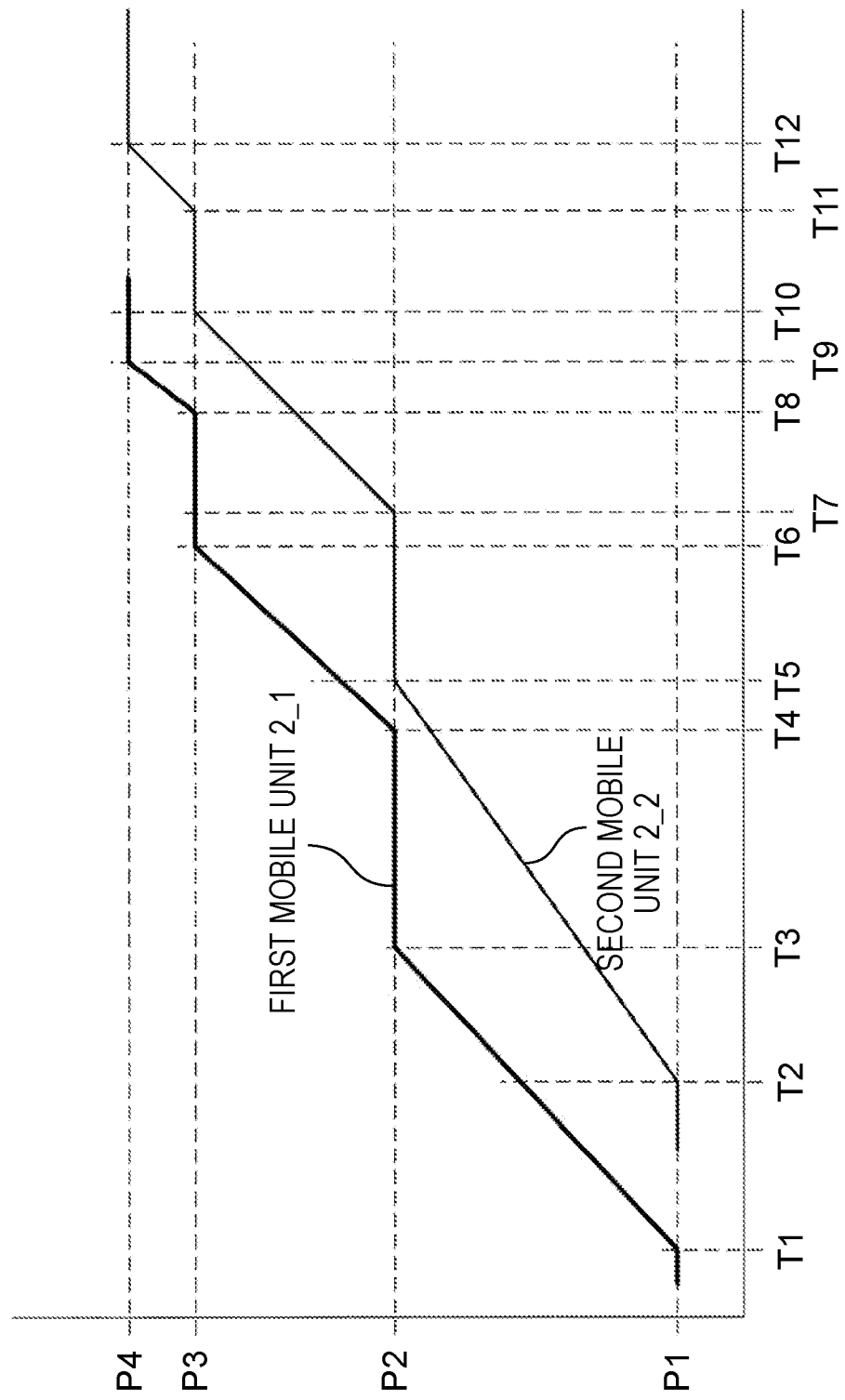
FIG. 5 is a diagram for illustrating a moving state of a first mobile unit and a second mobile unit.

FIG. 5 is a diagram for illustrating a relationship between a movement distance and time of first mobile unit 2_1 and second mobile unit 2_2, and FIGS. 6 to 18 are each a schematic diagram illustrating positions of first mobile unit 2_1 and second mobile unit2_2 on a predetermined time axis in FIG. 5. FIG. 5 illustrates an example in which it is assumed that first mobile unit2_1 and second mobile unit 2_2 guide visitors along a preset route in an art museum, a museum, or the like. First mobile unit 2_1 includes a route that is set for sequentially appreciating four exhibits from exhibit 1 to exhibit 4. The route is an example of the predetermined route. The route sets points suitable for appreciating the respective exhibits. In the following description, a point where exhibit 1 is appreciated is referred to as first point P1, a point where exhibit 2 is appreciated is referred to as second point P2, a point where exhibit 3 is appreciated is referred to as third point P3, and a point where exhibit 4 is appreciated is referred to as fourth point P4. FIG. 5 has a vertical axis representing movement distance, and a horizontal axis representing time.

FIG. 5 illustrates the example in which first mobile unit 2_1 first moves along a predetermined route, and second mobile unit 2_2 moves along the same route as first mobile unit 2_1 while following first mobile unit 2_1. Thus, first mobile unit 2_1 and second mobile unit 2_2 move along the same route. Although FIG. 5 illustrates the example in which one second mobile unit 2_2 reproduces distribution content, multiple second mobile units 2_2 may be provided. In the example, only one first mobile unit 2_1 records content.

Figure 6:
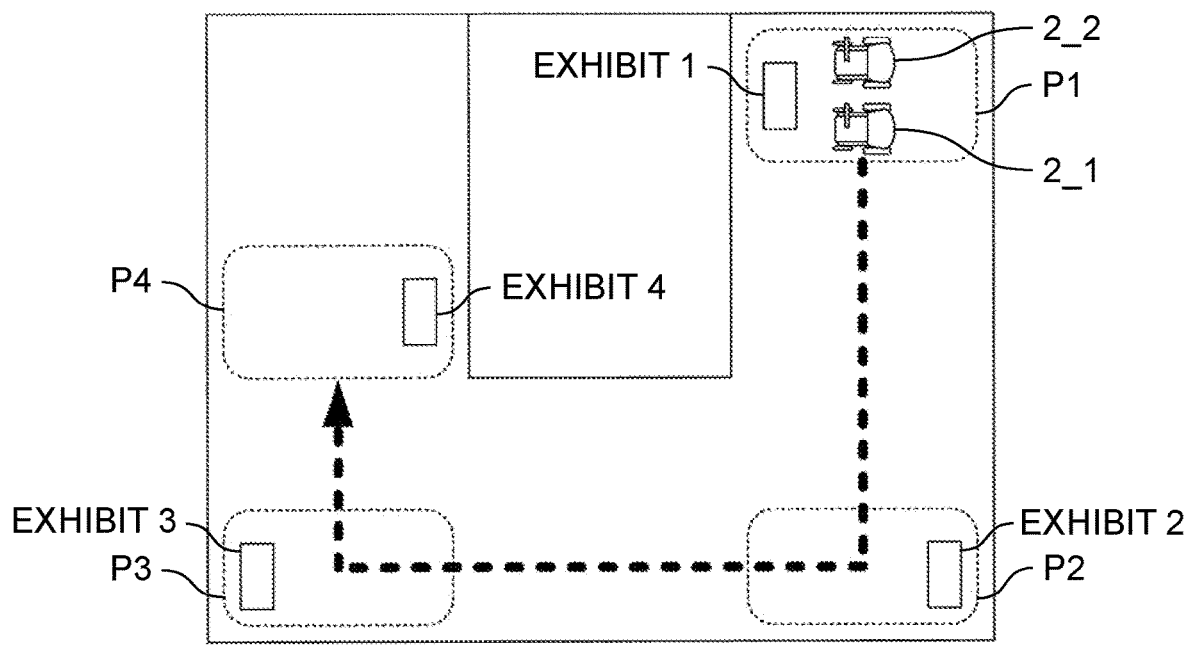
FIG. 6 is a diagram illustrating positions of a first mobile unit and a second mobile unit in an initial state.

In an initial state, first mobile unit 2_1 and second mobile unit 2_2 are each located at first point P1. FIG. 6 is a diagram illustrating positions of first mobile unit 2_1 and second mobile unit 2_2 in the initial state. FIG. 6 illustrates an example of exhibit 1 to exhibit 4, first point P1 to fourth point P4, and a route connecting first point P1 to fourth point P4. FIG. 6 illustrates the route connecting first point P1 to fourth point P4 and being indicated by an arrow of a broken line. FIG. 6 illustrates a state in which first mobile unit 2_1 and second mobile unit 2_2 are each located at first point P1.

First mobile unit 2_1 starts to record content based on an instruction or the like of the passenger, when first mobile unit 2_1 is located at first point P1, for example. The record content recorded by first mobile unit 2_1 includes at least any one of a state of exhibit 1 viewed from first mobile unit 2_1, and an image and a sound such as a comment of a person riding on first mobile unit 2_1. First mobile unit 2_1 continues to record the content until recording of content at fourth point P4 is completed after first mobile unit 2_1 arrives at fourth point P4 unless the passenger instructs to stop the recording. That is, first mobile unit 2_1 continues to record the content both during movement and during a temporary stop.

Figure 7:
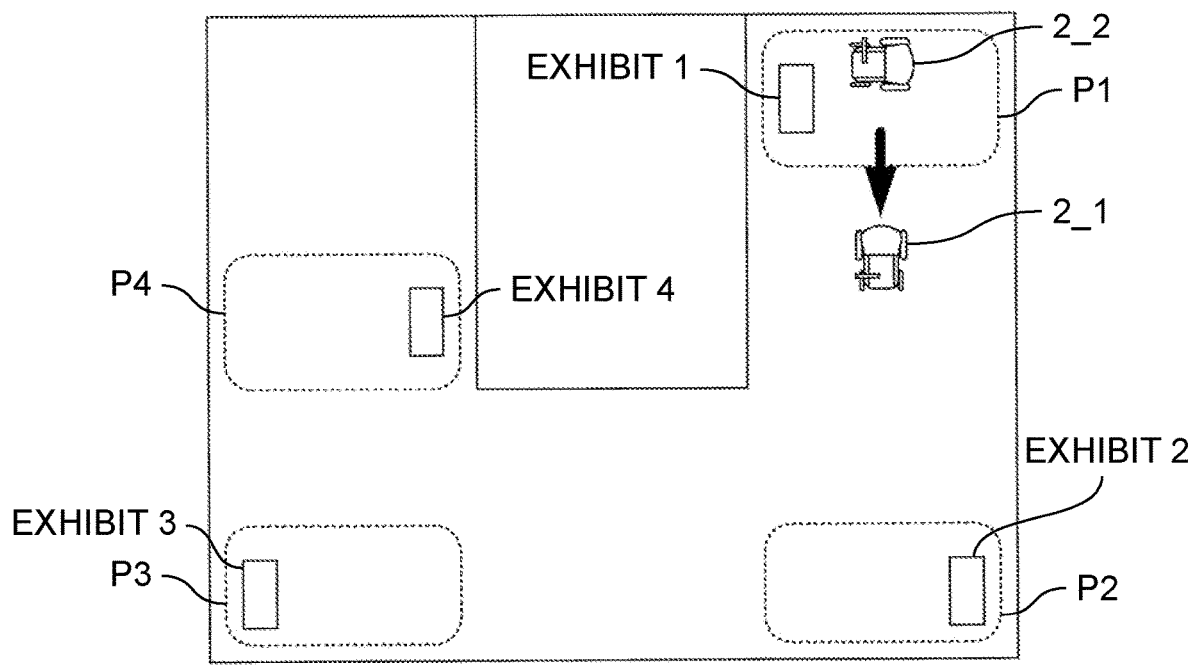
FIG. 7 is a diagram illustrating positions of a first mobile unit and a second mobile unit from time T1 to time T2.

FIG. 5 illustrates the example in which first mobile unit 2_1 starts to move toward second point P2 at time T1. Subsequently, second mobile unit 2_2 starts to move toward second point P2 at time T2. FIG. 7 is a diagram illustrating positions of first mobile unit 2_1 and second mobile unit 2_2 from time T1 to time T2.

Figure 8:
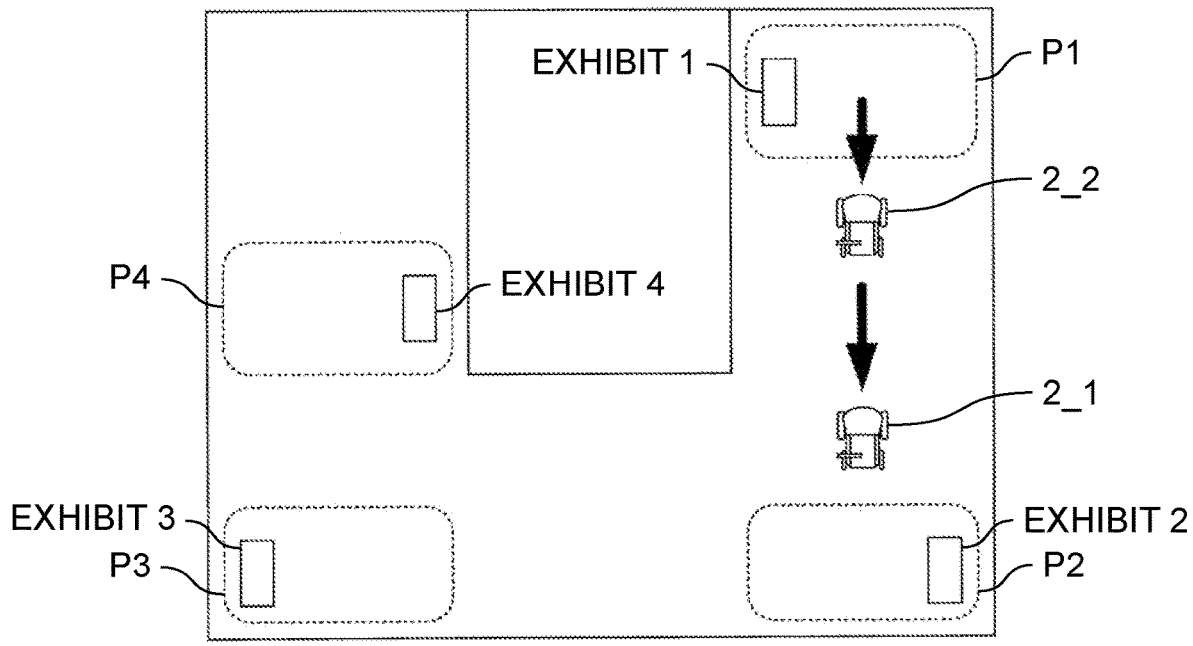
FIG. 8 is a diagram illustrating positions of a first mobile unit and a second mobile unit from time T2 to time T3.

First mobile unit 2_1 arrives at second point P2 at time T3, and temporarily stops to allow the passenger to appreciate exhibit 2. Second mobile unit 2_2 is in the middle of moving from first point P1 to second point P2 at time T3. FIG. 8 is a diagram illustrating positions of first mobile unit 2_1 and second mobile unit 2_2 from time T2 to time T3.

Figure 9:
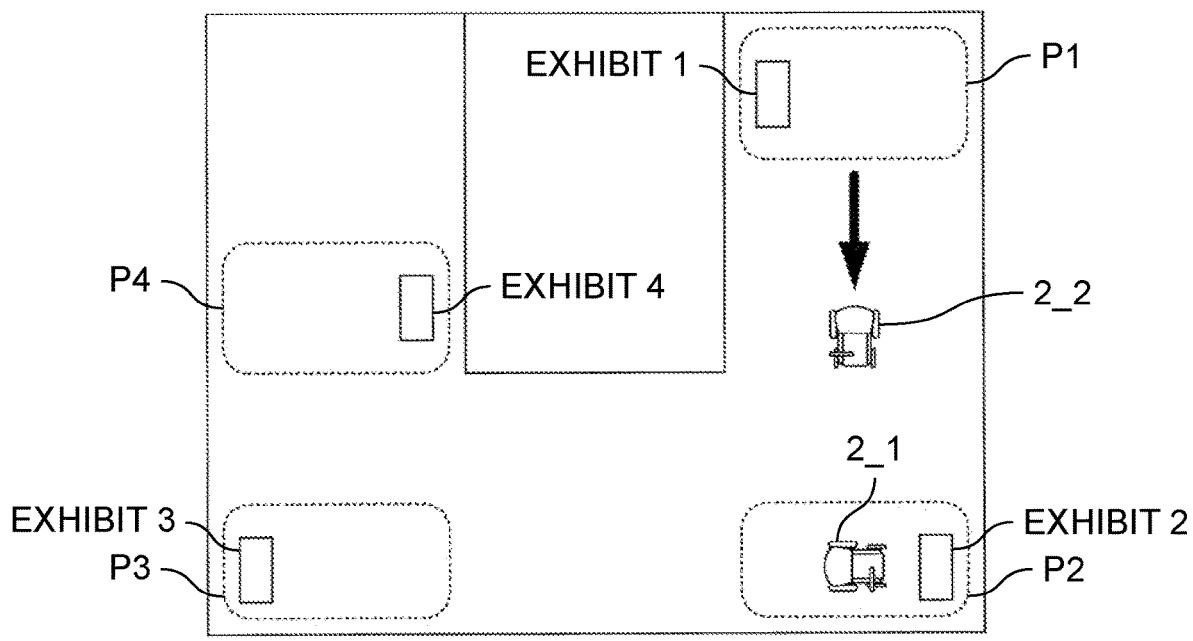
FIG. 9 is a diagram illustrating positions of a first mobile unit and a second mobile unit from time T3 to time T4.

First mobile unit 2_1 starts to move toward third point P3 at time T4. Then, second mobile unit 2_2 is still in the middle of moving from first point P1 to second point P2 at time T4. FIG. 9 is a diagram illustrating positions of first mobile unit 2_1 and second mobile unit 2_2 from time T3 to time T4.

Figure 10:
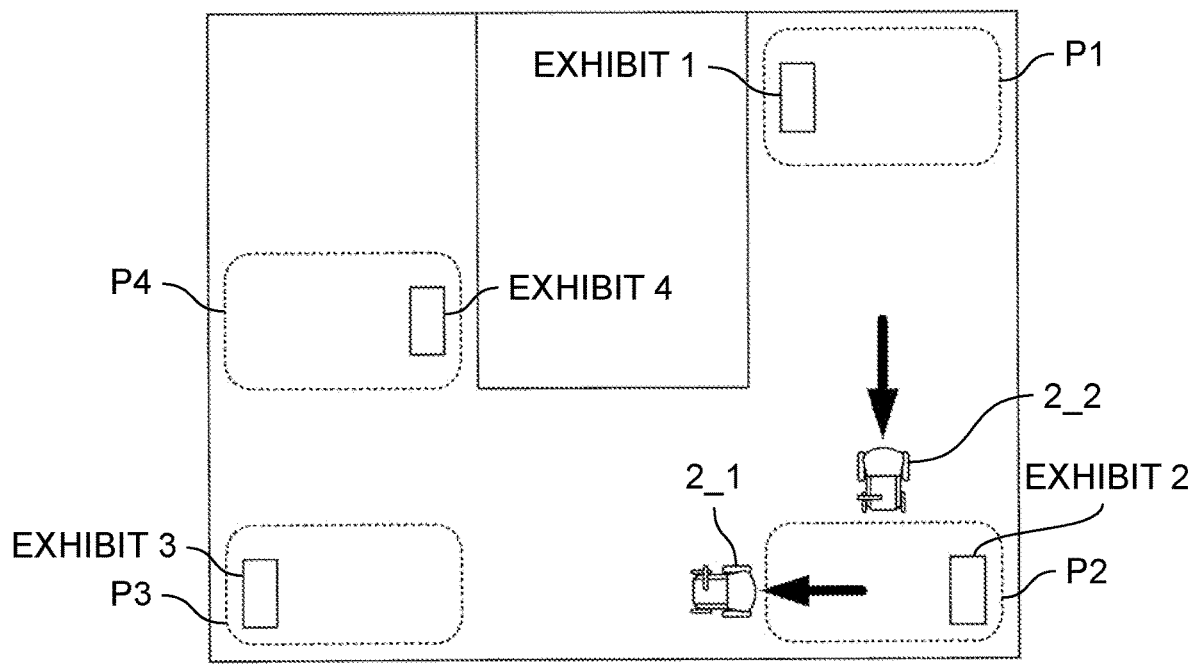
FIG. 10 is a diagram illustrating positions of a first mobile unit and a second mobile unit from time T4 to time T5.

Second mobile unit 2_2 arrives at second point P2 at time T5, and temporarily stops to allow the passenger to appreciate exhibit 2. Then, first mobile unit 2_1 is in the middle of moving from second point P2 to third point P3 at time T5. FIG. 10 is a diagram illustrating positions of first mobile unit 2_1 and second mobile unit 2_2 from time T4 to time T5.

Figure 11:
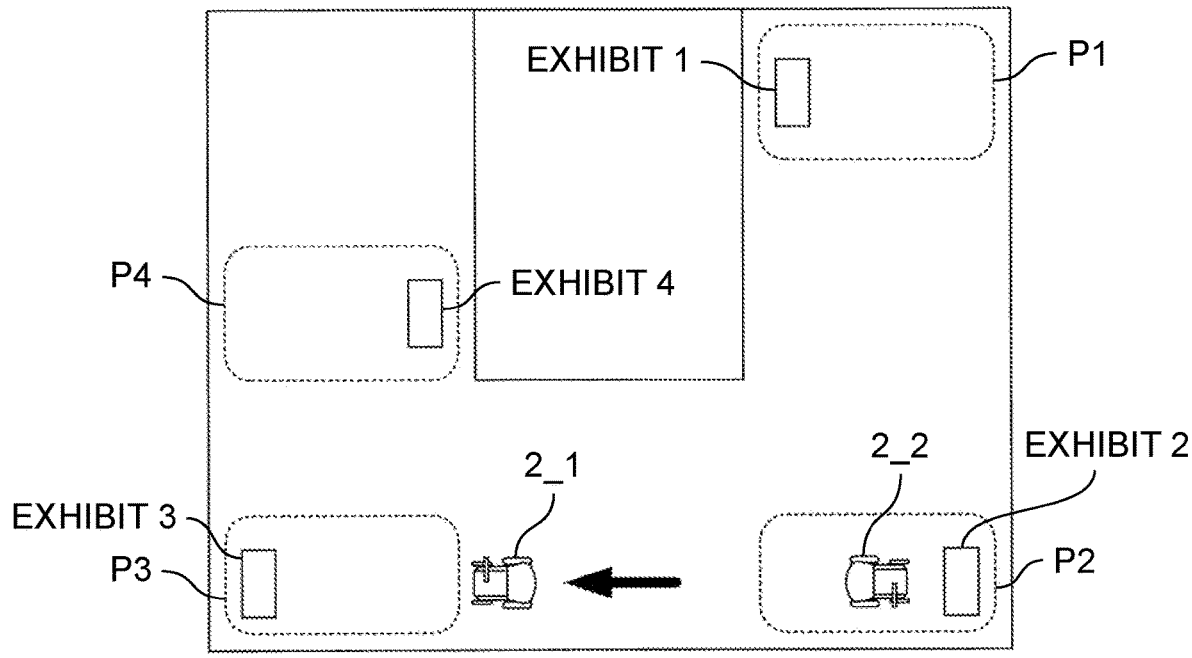
FIG. 11 is a diagram illustrating positions of a first mobile unit and a second mobile unit from time T5 to time T6.

First mobile unit 2_1 arrives at third point P3 at time T6, and temporarily stops to allow the passenger to appreciate exhibit 3. Then, second mobile unit 2_2 is still temporarily stopped at second point P2 at time T6. FIG. 11 is a diagram illustrating positions of first mobile unit 2_1 and second mobile unit 2_2 from time T5 to time T6.

Figure 12:
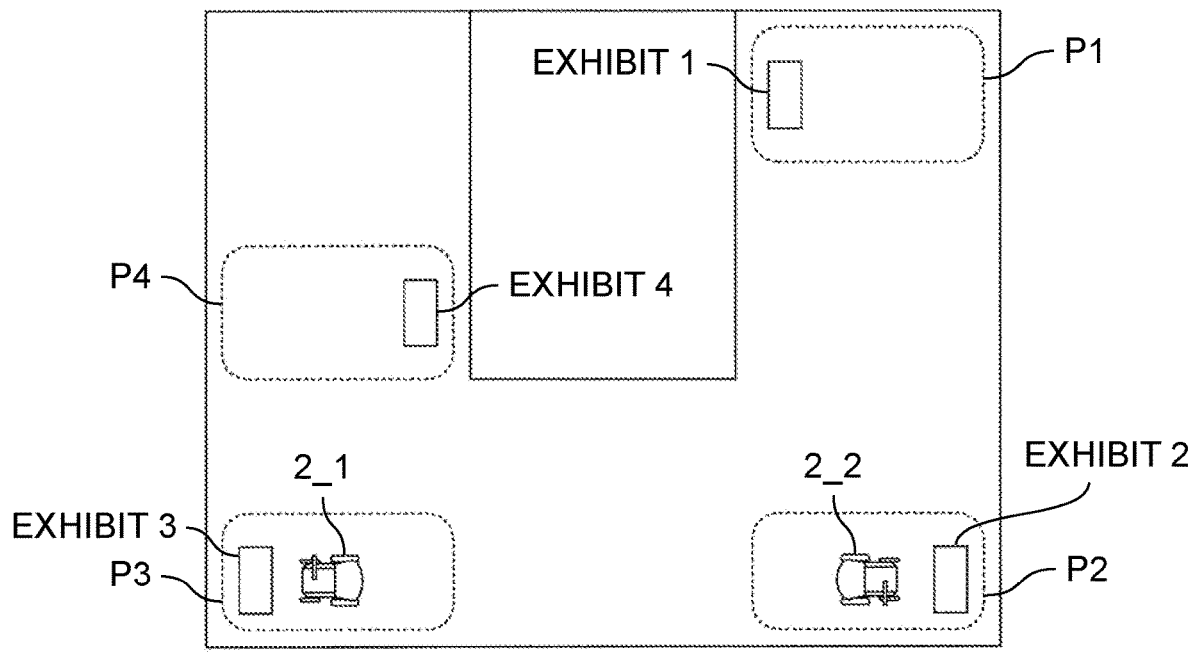
FIG. 12 is a diagram illustrating positions of a first mobile unit and a second mobile unit from time T6 to time T7.

Second mobile unit 2_2 starts to move toward third point P3 at time T7. Then, first mobile unit 2_1 is still temporarily stopped at third point P3 at time T7. FIG. 12 is a diagram illustrating positions of first mobile unit 2_1 and second mobile unit 2_2 from time T6 to time T7.

Figure 13:
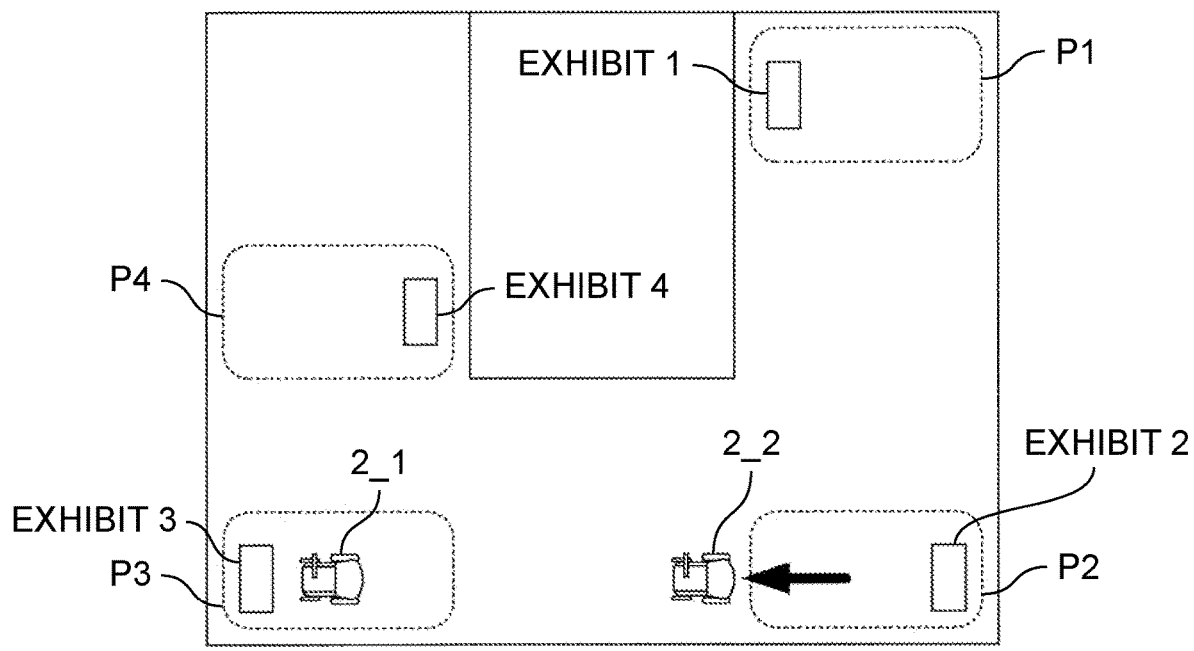
FIG. 13 is a diagram illustrating positions of a first mobile unit and a second mobile unit from time T7 to time T8.

First mobile unit 2_1 starts to move toward fourth point P4 at time T8. Then, second mobile unit 2_2 is in the middle of moving from second point P2 to third point P3 at time T8. FIG. 13 is a diagram illustrating positions of first mobile unit 2_1 and second mobile unit 2_2 from time T7 to time T8.

Figure 14:
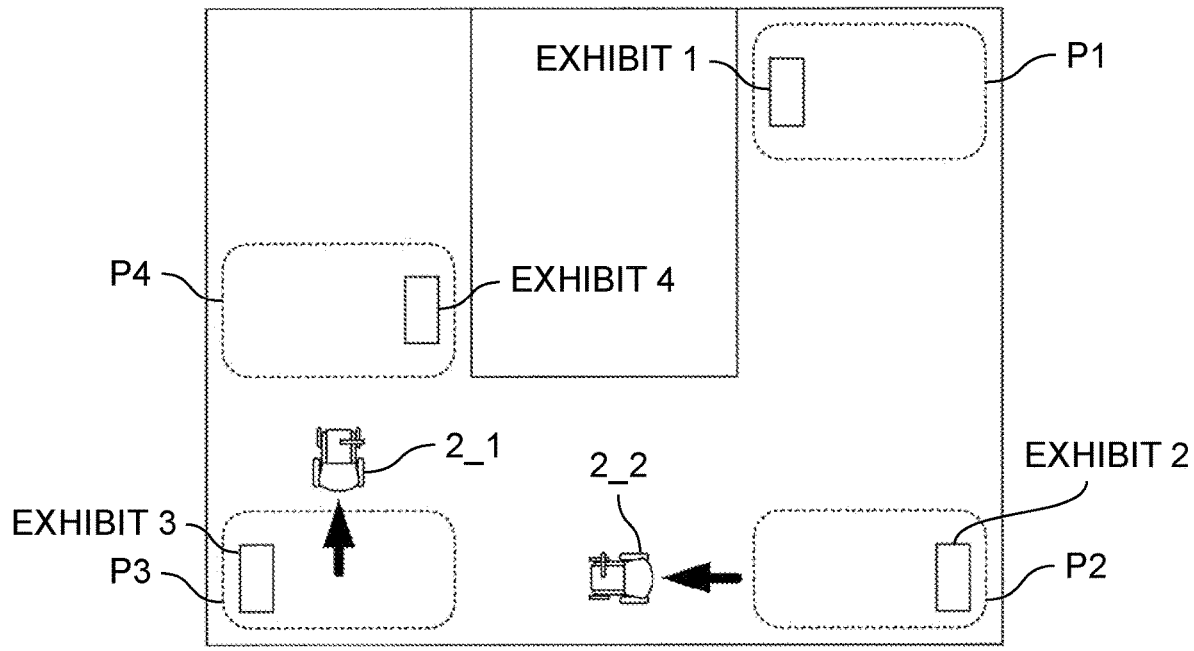
FIG. 14 is a diagram illustrating positions of a first mobile unit and a second mobile unit from time T8 to time T9.

First mobile unit 2_1 arrives at fourth point P4 at time T9, and temporarily stops to allow the passenger to appreciate exhibit 4. Then, second mobile unit 2_2 is still in the middle of moving from second point P2 to third point P3 at time T9. FIG. 14 is a diagram illustrating positions of first mobile unit 2_1 and second mobile unit 2_2 from time T8 to time T9.

Figure 15:
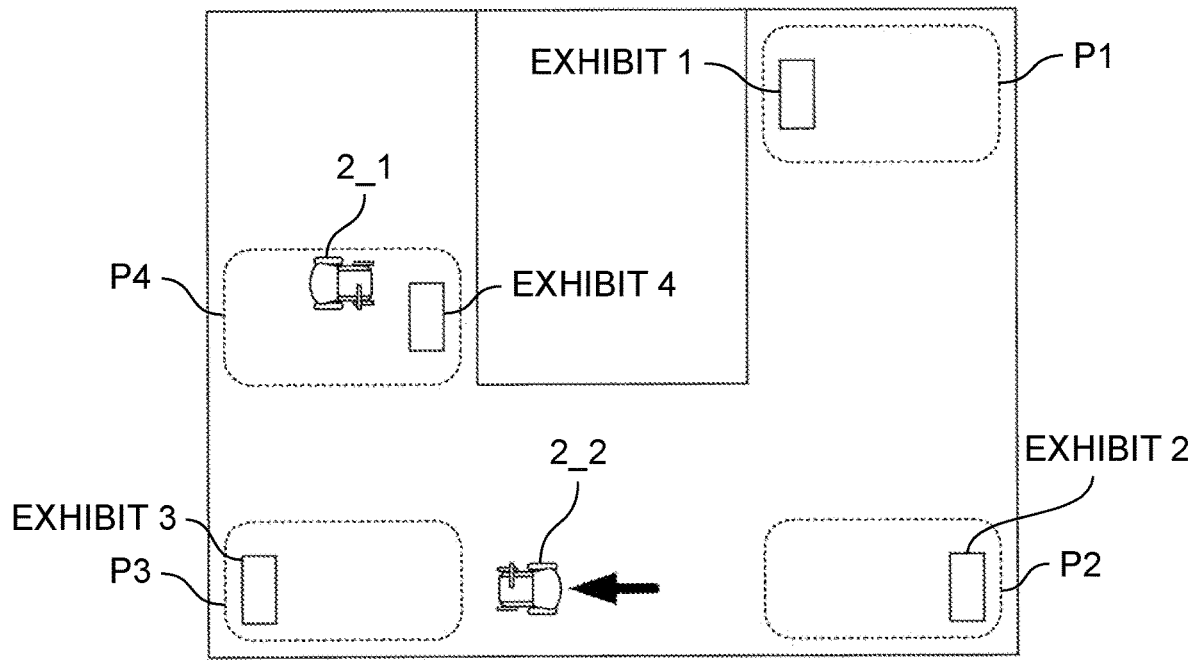
FIG. 15 is a diagram illustrating positions of a first mobile unit and a second mobile unit from time T9 to time T10.

Second mobile unit 2_2 arrives at third point P3 at time T10, and temporarily stops to allow the passenger to appreciate exhibit 3. Then, first mobile unit 2_1 is still temporarily stopped at fourth point P4 at time T10. FIG. 15 is a diagram illustrating positions of first mobile unit 2_1 and second mobile unit 2_2 from time T9 to time T10.

Figure 16:
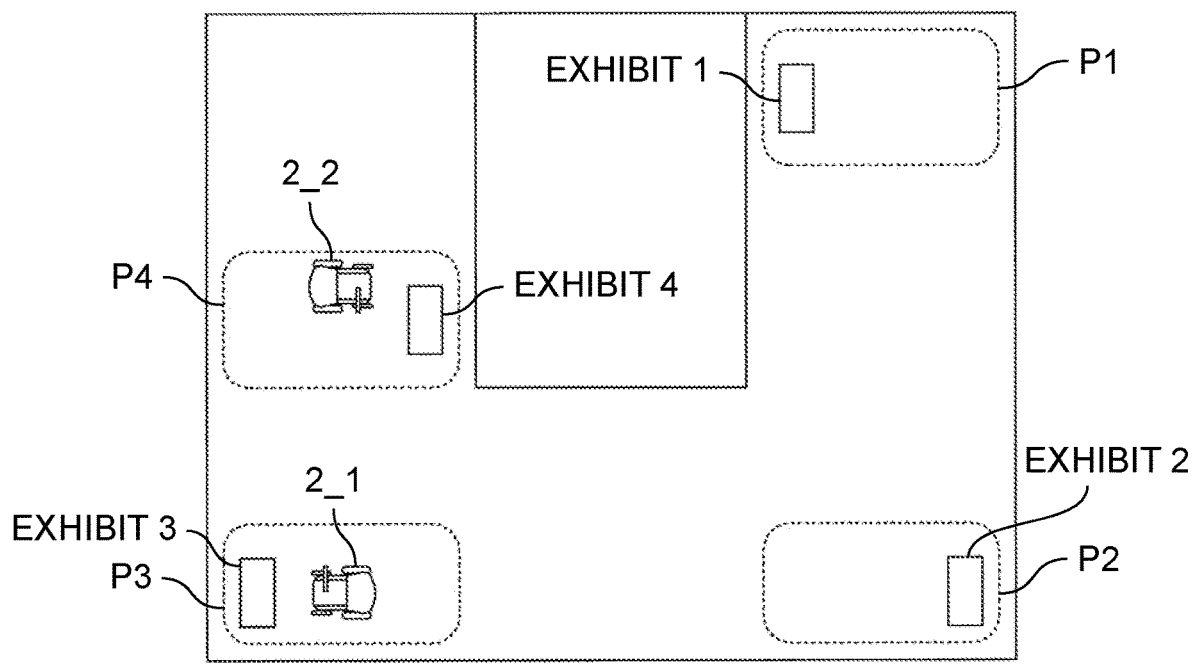
FIG. 16 is a diagram illustrating positions of a first mobile unit and a second mobile unit from time T10 to time T11.

Second mobile unit 2_2 starts to move toward fourth point P4 at time T11. Then, first mobile unit 2_1 is still temporarily stopped at fourth point P4 at time T11. FIG. 16 is a diagram illustrating positions of first mobile unit 2_1 and second mobile unit 2_2 from time T10 to time T11.

Figure 17:
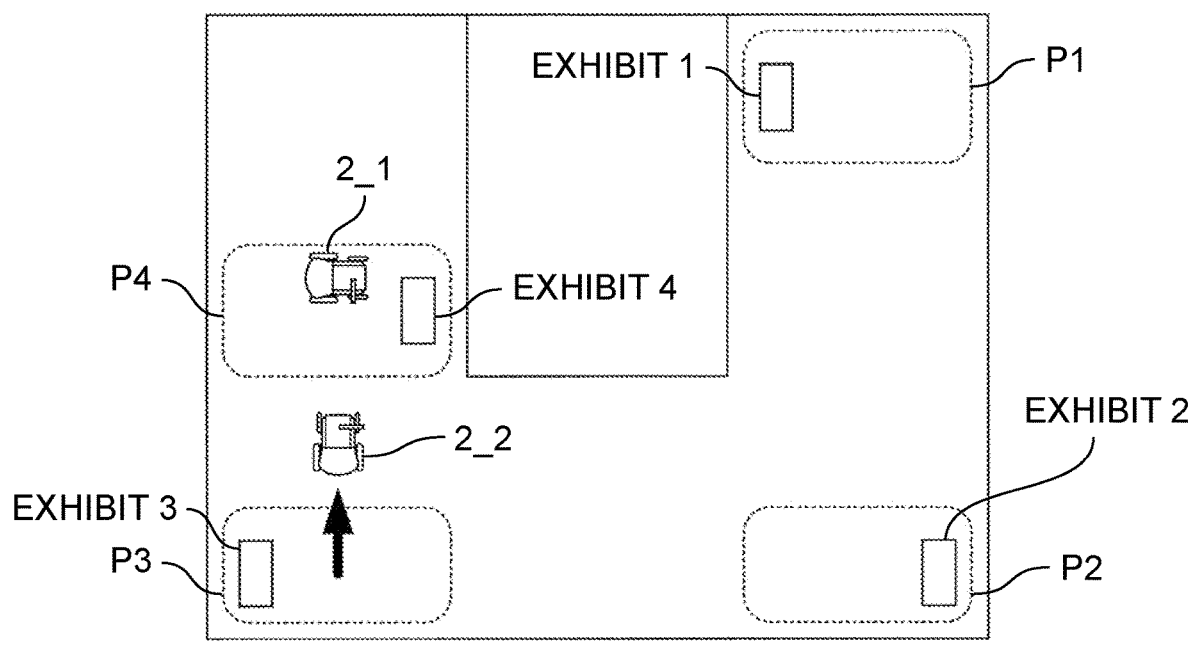
FIG. 17 is a diagram illustrating positions of a first mobile unit and a second mobile unit from time T11 to time T12.
Figure 18:
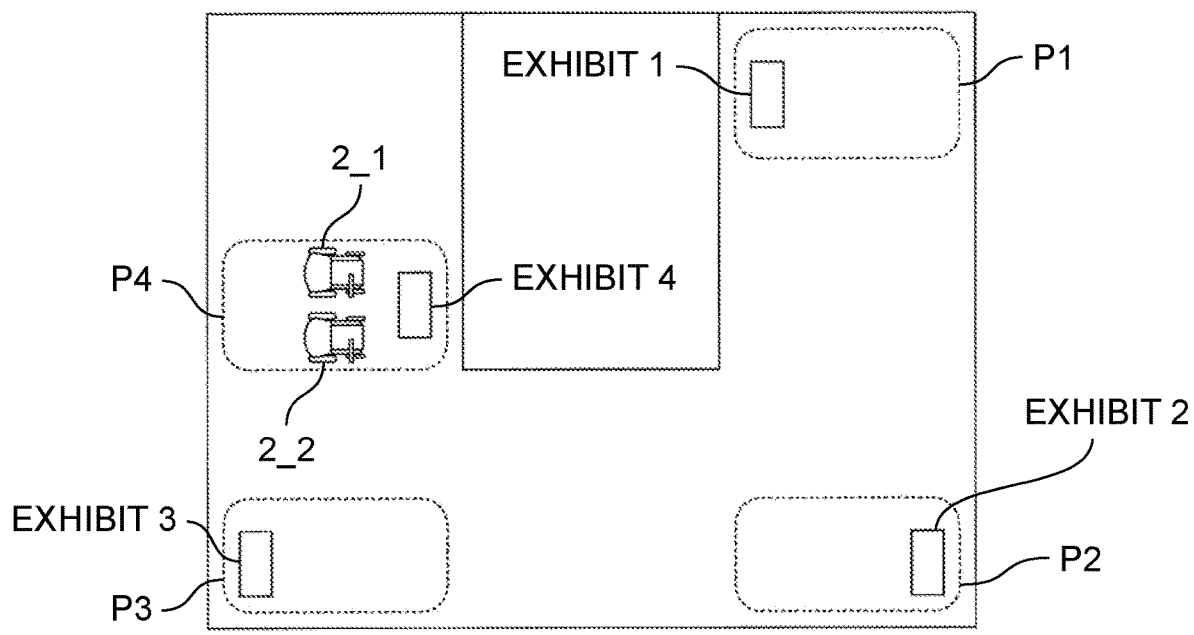
FIG. 18 is a diagram illustrating positions of a first mobile unit and a second mobile unit after time T12.

Second mobile unit 2_2 starts to move toward fourth point P4 at time T12. Then, first mobile unit 2_1 is still temporarily stopped at fourth point P4 at time T12. FIG. 17 is a diagram illustrating positions of first mobile unit 2_1 and second mobile unit 2_2 from time T11 to time T12. FIG. 18 is a diagram illustrating positions of first mobile unit 2_1 and second mobile unit 2_2 after time T12.

When first mobile unit 2_1 arrives at fourth point P4 and recording of content at fourth point P4 is completed, first mobile unit 2_1 stops the recording. While moving along the predetermined route, first mobile unit 2_1 may transmit the record content recorded to information processor 1 as needed, or may advance the recording of the content to some extent and then collectively transmit a certain amount of the record content to information processor 1.

As described above, first mobile unit 2_1 and second mobile unit 2_2 sequentially move along the predetermined route with a time difference. Although second mobile unit 2_2 desirably moves following a trajectory along which first mobile unit 2_1 has moved, second mobile unit 2_2 does not need to follow exactly the same trajectory as that of first mobile unit 2_1.

Second mobile unit 2_2 receives the record content recorded by first mobile unit 2_1 as distribution content from information processor 1. Then, second mobile unit 2_2 reproduces the distribution content while allowing a current position of second mobile unit 2_2 to coincide with a position where first mobile unit 2_1 has recorded. As a specific example, second mobile unit 2_2 receives the record content recorded by first mobile unit 2_1 at a point, where a certain exhibit can be appreciated, as the distribution content, and reproduces the distribution content at timing when second mobile unit 2_2 is located at the point where the certain exhibit can be appreciated. More specifically, second mobile unit 2_2 receives, as the distribution content, the record content that is started to be recorded at timing when first mobile unit 2_1 arrives at the point where the exhibit can be appreciated, and starts to reproduce the distribution content at timing when the second mobile unit arrives at the point where the exhibit can be appreciated.

FIG. 5 indicates line segments that are each inclined at an angle corresponding to moving speed of corresponding one of mobile units 2. FIG. 5 illustrates the example in which the moving speed when first mobile unit 2_1 moves from first point P1 to second point P2 is faster than the moving speed when second mobile unit 2_2 moves from first point P1 to second point P2. Thus, when second mobile unit 2_2 receives record content recorded for a certain period of time while first mobile unit 2_1 moves from first point P1 to second point P2 as distribution content and reproduces the distribution content at a constant speed (i.e., for the same constant time as that of first mobile unit 2_1) while second mobile unit 2_2 moves from first point P1 to second point P2, the reproduction of the distribution content is completed before second mobile unit 2_2 arrives at second point P2. To avoid such a situation, reproduction speed of the distribution content may be changed in accordance with moving speed of each mobile unit 2. A method for changing the reproduction speed of the distribution content will be described in detail in FIG. 23 described later.

Example of Content

Next, examples of record content to be recorded, and distribution content to be distributed and reproduced, will be described.

Figure 19A:
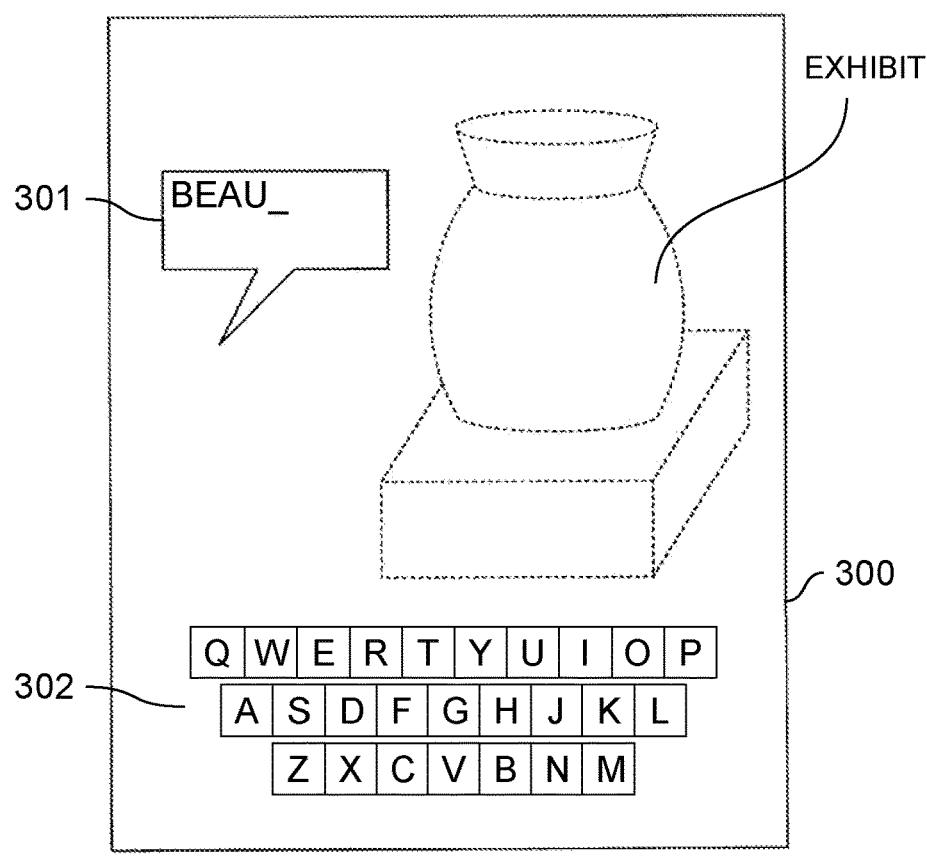
FIG. 19A is a diagram for illustrating a state in which a first mobile unit records content.
Figure 19B:
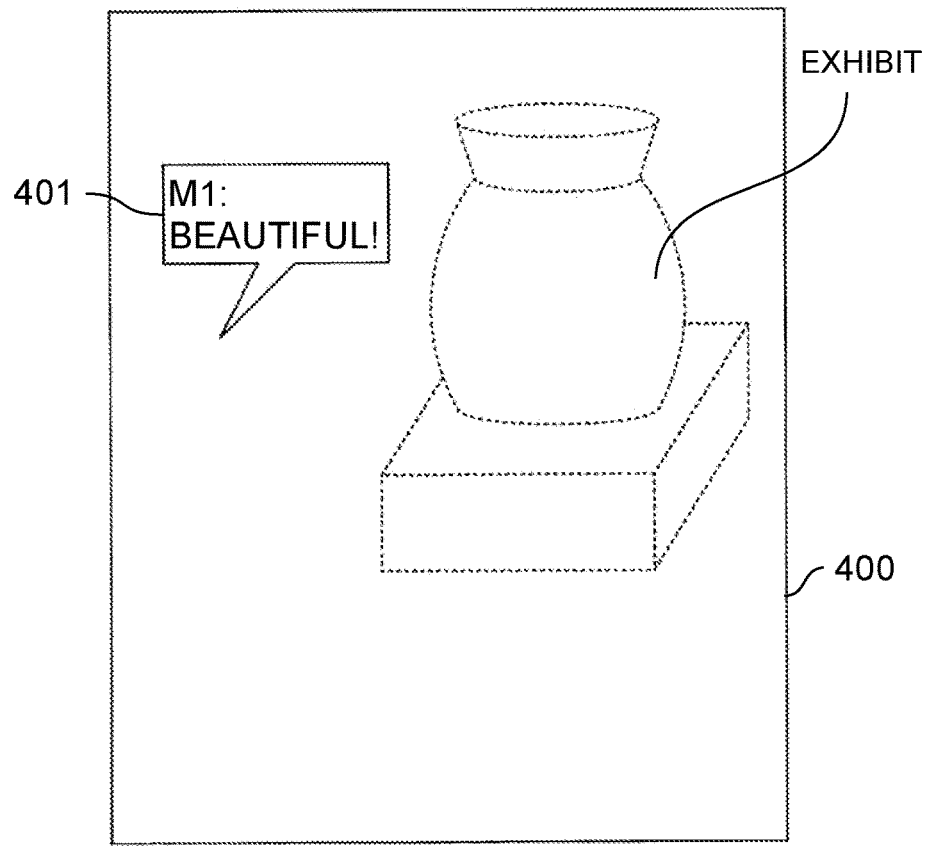
FIG. 19B is a diagram for illustrating a state in which a second mobile unit reproduces the content recorded in FIG. 19A.

FIG. 19A illustrates an example of recording of content. FIG. 19B illustrates an example of reproduction of distribution content. The present example uses a comment as an example of the content.

The present disclosure shows various kinds of content including a content that is instantaneously recorded and does not include a difference with elapse of time and content that includes a difference over time. The comment is an example of the content that is instantaneously recorded and does not include a difference with elapse of time. Other examples of the content that does not include a difference with elapse of time include a still image such as a photograph of a landscape. Examples of the content including a difference with elapse of time include a moving image, a sound, and the like.

First, a state in which first mobile unit 2_1 records content will be described. FIG. 19A is a diagram for illustrating a state in which first mobile unit 2_1 records content. FIG. 19A illustrates the state in which a comment issued by a passenger is recorded as the content when first mobile unit 2_1 is located at a point where an exhibit can be appreciated in an art museum, a museum, or the like. FIG. 19A illustrates screen 300 that includes comment input field 301 and software keyboard 302.

FIG. 19A illustrates an example in which it is assumed that display 202 (see FIG. 4) of first mobile unit 2_1 on which screen 300 is displayed is a transmissive display. This configuration allows the exhibit to be visible through screen 300. FIGS. 19A and 19B each illustrate the exhibit visible through screen 300 that is indicated by a broken line. The passenger of first mobile unit 2_1 inputs a comment such as an impression in comment input field 301 while viewing the exhibit through or without screen 300.

Comment input field 301 is used for displaying a comment such as an impression held by the passenger of first mobile unit 2_1 when viewing exhibit 2. Software keyboard 302 is an input means for inputting characters to be displayed in a comment field. Comment input field 301 and software keyboard 302 are displayed when the passenger touches a part of screen 300, for example. Comment input field 301 is displayed at a position touched by the passenger, for example, and software keyboard 302 is displayed at a predetermined position in screen 300, for example.

Next, a state in which second mobile unit 2_2 reproduces distribution content will be described.

FIG. 19B is a diagram for illustrating a state in which the record content recorded in FIG. 19A is distributed as the distribution content and second mobile unit 2_2 reproduces the distribution content. FIG. 19B illustrates the state in which second mobile unit 2_2 reproduces the distribution content after the record content recorded in FIG. 19A is distributed as the distribution content when second mobile unit 2_2 is located at a point where an exhibit for which first mobile unit 2_1 has recorded the content in FIG. 19A can be appreciated.

FIG. 19B illustrates a display of second mobile unit 2_2 that is also a transmissive display as in first mobile unit 2_1. This configuration allows the exhibit to be visible through screen 400.

Screen 400 includes comment field 401 including the comment of the passenger of first mobile unit 2_1 corresponding to the record content recorded in FIG. 19A, comment field 401 being displayed as the distribution content. Comment field 401 is desirably displayed at a position in screen 400, the position being substantially identical to the position of comment input field 301 in screen 300 illustrated in FIG. 19A. Comment field 401 in FIG. 19B displays a comment, "M1: BEAUTIFUL!" in which M1 is an identification number (unit number) of first mobile unit 2_1. As described above, the record content is desirably reproduced by associating the record content recorded with attribute information on a person or an object having recorded the record content. As a result, a passenger of second mobile unit 2_2 can easily find which mobile unit 2 takes a passenger having made the comment.

As described above, position information at the time of recording the content is associated with the record content, and the distribution content is reproduced in accordance with the position at the time of recording. Thus, the passengers riding on the respective multiple mobile units 2 can share the same experience.

As in the present example, second mobile unit 2_2 desirably reproduces the distribution content corresponding to the record content continuously before and after the recording time, even when the record content recorded in first mobile unit 2_1 is instantaneously recorded, or does not include a difference with elapse of time. This configuration enables suppressing a problem in that the passenger of second mobile unit 2_2 cannot view content in comment field 401 because comment field 401 is displayed for only a moment, for example.

Additionally, time during which the passenger inputs a comment on software keyboard 302 may be regarded as a start time of recording content. In this case, the content is recorded as a moving image showing how the passenger inputs the comment. Then, the content is distributed as distribution content including a difference with elapse of time from the start of recording, and is reproduced by second mobile unit 2_2, as in another example to be described later. Reproducing such distribution content allows the passenger of second mobile unit 2_2 to think that the passenger of first mobile unit 2_1 seems to input an impression in real time, for example, and thus enabling a stronger impression of sharing the same experience as the passenger of first mobile unit 2_1 to be given to the passenger of the second mobile unit 2_2.

Figure 20A:
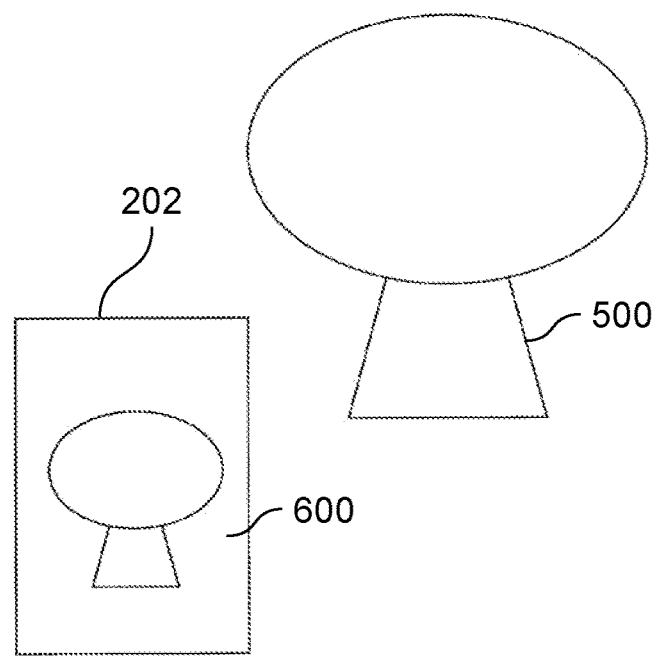
FIG. 20A is a diagram exemplifying a field of view of a passenger of a first mobile unit at the time of recording content.
Figure 20B:
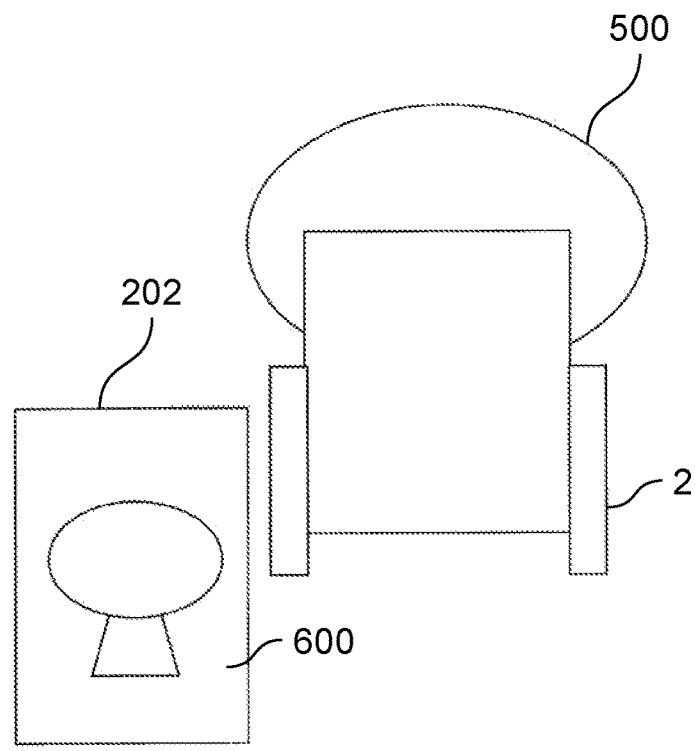
FIG. 20B is a diagram exemplifying a field of view of a passenger of a second mobile unit at the time of reproducing content.

FIGS. 20A and 20B each illustrate another example of recording and reproducing content. The present example shows a moving image as an example of content including a difference with elapse of time. That is, the content including an elapsed time from a start of recording, such as a moving image and a sound, is exemplified.

The example illustrated in each of FIGS. 20A and 20B shows content of a case where first mobile unit 2_1 and second mobile unit 2_2 move along a preset tourist route including tourist spots such as a waterfall, a cherry tree, autumn leaves, and a flowerbed in a tourist spot such as a vast park.

Even when many visitors ride on second mobile unit 2_2 and move in the vast park, a situation where first mobile unit 2_1 and multiple second mobile units 2_2 stray from each other can be prevented by moving in a row, and thus enabling movement in a group with high safety and a sense of security for the passenger.

When first mobile unit 2_1 and multiple second mobile unit 2_2 move in a raw, the passenger may be less likely to view a landscape that the passenger wants to see because the landscape is hidden behind mobile unit 2 moving forward. When a landscape is recorded as the record content while first mobile unit 2_1 moves at the head and distribution content corresponding to the record content is reproduced in second mobile unit 2_2 that moves following first mobile unit 2_1, the passenger can view a landscape that the passenger wants to see even in a case where the landscape is hidden behind mobile unit 2 moving ahead.

FIGS. 20A and 20B each illustrate the example in which it is assumed that display 202 of mobile unit 2 is not a transmissive type. FIG. 20A is a diagram exemplifying a field of view of the passenger of first mobile unit 2_1 at the time of recording content. FIG. 20A illustrates tree 500 as an example of a landscape that can be viewed by the passenger of first mobile unit 2_1, and display 202 that displays image 600 obtained by photographing tree 500.

In contrast, FIG. 20B is a diagram exemplifying a field of view of the passenger of second mobile unit 2_2 at the time of reproducing distribution content corresponding to the record content recorded in FIG. 20A. It is assumed in FIG. 20B that the passenger of second mobile unit 2_2 cannot view tree 500 hidden behind mobile unit 2 in front. However, display 202 displays image 600 acquired by reproducing the distribution content corresponding to the record content in FIG. 20A, so that the passenger can experience how tree 500 looks. As a result, the passenger of first mobile unit 2_1 and the passenger of second mobile unit 2_2 can have a common experience.

FIGS. 20A and 20B each illustrate the example in which it is assumed that first mobile unit 2_1 and second mobile unit 2_2 move in a row. Besides this, content can be similarly recorded and reproduced even when first mobile unit 2_1 and second mobile unit 2_2 are separated from each other and move along the same route, for example.

Additionally, timing at which first mobile unit 2_1 performs recording and timing at which second mobile unit 2_2 performs reproduction may be greatly different from each other. For example, first mobile unit 2_1 may record a state in which cherry blossoms bloom in spring as record content, and when mobile unit 2 moves around a route in the fall, distribution content corresponding to the record content indicating the state in which the cherry blossoms bloom may be reproduced while mobile unit 2 moves among trees having autumn leaves. Even in such a case, the passenger of mobile unit 2 can share the same experience.

As another example of the content including a difference with elapse of time from the start of recording, a voice uttered by a passenger looking at an exhibit may be recorded as the content, for example. In this case, a microphone provided in first mobile unit 2_1 records the voice of the passenger. Further developed examples include a case where a passenger of the first mobile unit 2_1 is a commentator of an art museum or a museum, and record content is a voice such as commentary of an exhibit, for example. In such a case, first mobile unit 2_1 on which the commentator rides moves in a building, and commentary made by the commentator at a point where the exhibit can be appreciated is recorded as the record content. Then, second mobile unit 2_2 on which a visitor rides moves along a trajectory along which first mobile unit 2_1 has moved, and distribution content corresponding to the record content including the commentary made by the commentator at the point where the exhibit can be appreciated is reproduced. As a result, when many visitors ride on multiple second mobile units 2_2, the visitors can have a common experience of hearing the same commentary at a point where the same exhibit can be viewed.

The Content to be Recorded and Reproduced May be a Combination of Multiple examples of the various kinds of contents described above. In a situation of a stadium tour where a sporting event is watched, for example, mobile unit 2 outputs information related to sports onto a display being reproduction device 24 while causing a guide voice to emit from a speaker being reproduction device 24. As described above, the content to be recorded and reproduced may be a combination of content that is instantaneously recorded and does not include a difference with elapse of time from a start of recording, and content including a difference with elapse of time from the start of recording. In the same situation as the stadium tour described above, for example, mobile unit 2 may display a current state of the stadium and a practice scenery of players previously recorded in the same stadium on the display being reproduction device 24 in a superimposed manner while causing a guide voice to emit from the speaker being reproduction device 24.

[Processing Content]

Hereinafter, details of processing content of information processing system 100 for moving mobile unit 2 and reproducing content as described above will be described with reference to FIG. 21.

Figure 21:
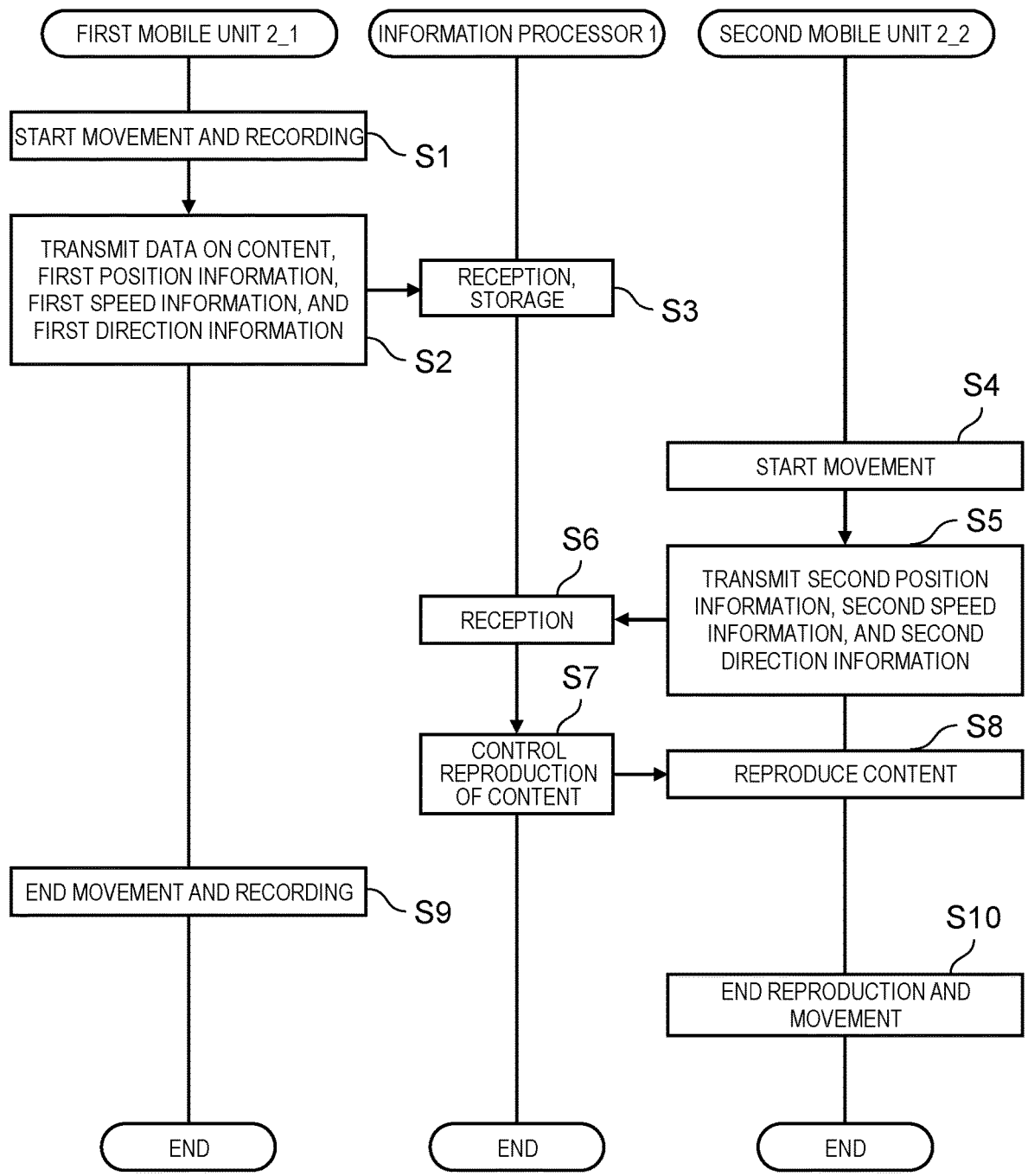
FIG. 21 is a sequence diagram for illustrating operation of an information processing system.

In step S1, first mobile unit 2_1 starts to move along a predetermined route and starts to record content. Although FIG. 21 illustrates an example in which first mobile unit 2_1 starts to move and record content substantially at the same time, first mobile unit 2_1 may start to move before recording the content, or may start to record the content before moving, for example.

First mobile unit 2_1 records various kinds of record content such as a comment (character), a still image, a moving image, and a sound as described above. When the record content is instantaneously recorded like a comment or a still image and does not include a difference with elapse of time from a start of recording, time information indicating elapsed time from the start of recording is added. When the record content is a moving image including a difference with elapse of time from the start of recording, and the moving image includes a plurality of frames, the record content may include frame information indicating numerical order of a certain frame from the start of recording instead of the time information.

First mobile unit 2_1 also generates its own position information while recording the content, and stores the position information in association with the record content recorded. More specifically, while recording the content, first mobile unit 2_1 generates first position information indicating a position of first mobile unit 2_1, and stores the first position information in storage unit 27 in association with the time information or the frame information included in the record content. For example, the first position information includes positions of respective multiple first mobile units 2_1, corresponding to multiple times, during recording of the content. The first position information and the time information or the frame information enable identifying which segment of the record content is recorded at which position where first mobile unit 2_1 is located in the predetermined route.

First mobile unit 2_1 generates first speed information indicating moving speed of first mobile unit 2_1 during movement, and stores the first speed information in storage unit 27 in association with the time information on the record content. As a result, speed of first mobile unit 2_1 while the content is recorded can be easily specified.

First mobile unit 2_1 further generates first direction information indicating a moving direction of first mobile unit 2_1 during movement, and stores the first direction information in storage unit 27 in association with the time information on the record content. As a result, the moving direction of first mobile unit 2_1 while the content is recorded can be easily specified.

In step S2, first mobile unit 2_1 transmits the following to information processor 1: record content recorded; the first position information indicating a position of first mobile unit 2_1 during recording of the record content; the first speed information indicating moving speed of first mobile unit 2_1 during recording of the record content; and the first direction information indicating a moving direction of first mobile unit 2_1 during recording of the record content.

In step S2, first mobile unit 2_1 may transmit record content recorded up to that time as needed, or may advance the recording of the content to some extent and then collectively transmit a certain amount of the record content. Examples of transmitting the record content as needed include a case where the record content such as a moving image generated for each frame is transmitted for each frame. Examples of collectively transmitting a certain amount of record content include a case where a series of record contents recorded at one point in a predetermined route is collectively transmitted at a time point at which recording at the one point is completed.

In step S3, information processor 1 receives the record content, the first position information, the first speed information, and the first direction information, and stores the record content, the first position information, the first speed information, and the first direction information in storage unit 13, in association with each other. Specifically, information processor 1 stores the first position information as recording position information indicating a position where first mobile unit 2_1 records, in association with the record content. Information processor 1 further stores the first speed information as recording speed information indicating a moving speed of first mobile unit 2_1 during recording, in association with the record content. Additionally, information processor 1 stores the first direction information as recording direction information indicating a moving direction of first mobile unit 2_1 during recording, in association with the record content. Repeating this processing causes storage unit 13 to accumulate a series of contents recorded up to that time, and the recording position information, the recording speed information, and the recording direction information, in association with the content.

Then, second mobile unit 2_2 starts to move in step S4. When multiple second mobile units 2_2 are used, the multiple second mobile units 2_2 may start to move one by one with a necessary inter-vehicle distance, for example. FIG. 21 illustrates operation of one second mobile unit 2_2.

In step S5, second mobile unit 2_2 generates second position information indicating its own position, second speed information indicating its own moving speed, and second direction information indicating its own moving direction, and transmits the information items to information processor 1.

In step S6, information processor 1 receives the second position information indicating a current position of second mobile unit 2_2, the second speed information indicating the moving speed thereof, and the second direction information indicating the moving direction thereof.

In step S7, information processor 1 transmits distribution content to second mobile unit 2_2 based on the record content recorded by first mobile unit 2_1, the recording position information, the recording speed information, and the recording direction information, which are stored in storage unit 13 in step S3, and the second position information, the second speed information, and the second direction information, which are received in step S6. When multiple record contents and related data thereon are stored in storage unit 13, the record content associated with the recording position information substantially coinciding with the second position information may be the distribution content to be distributed to second mobile unit 2_2. Details of reproduction control of the distribution content for second mobile unit 2_2 in this step S7 will be described later.

In step S8, second mobile unit 2_2 starts reproduction of the distribution content based on reproduction control with information processor 1 in step S7.

In step S9, first mobile unit 2_1 finishes recording content and moving. Subsequently, second mobile unit 2_2 finishes reproducing the distribution content and moving in step S10.

The operation of information processing system 100 has been described above. This kind of operation enables the record content recorded by first mobile unit 2_1 to be reproduced as the distribution content at the same position in second mobile unit 2_2 moving along the same route as first mobile unit 2_1. As a result, the same landscape, scenery, or scene as the landscape, scenery, or scene viewed by a person riding on first mobile unit 2_1 can be similarly experienced by a person riding on second mobile unit 2_2, and the same experience can be shared among persons appearing in the multiple second mobile units 2_2.

[Processing of Information Processor 1]

Next, processing performed by information processor 1 in the operation of information processing system 100 illustrated in FIG. 21 will be described in detail with reference to FIG. 22.

In step S11, information processor 1 receives the record content, the first position information, the first speed information, and the first direction information from first mobile unit 2_1. The record content is recorded by first mobile unit 2_1 as described above.

In step S12, information processor associates the first position information, the first speed information, and the first direction information, which are received in step S11, with the record content, as the recording position information indicating a position where first mobile unit 2_1 records, the recording speed information indicating a moving speed of first mobile unit 2_1 during recording, and the recording direction information indicating a moving direction of first mobile unit 2_1 during recording, respectively.

In step S13, information processor 1 stores the record content, the recording position information, the recording speed information, and the recording direction information, which are associated with each other in step S12, in storage unit 27.

In step S14, information processor 1 receives the second position information, the second speed information, and the second direction information from second mobile unit 2_2.

In step S15, information processor 1 determines content (distribution content) to be distributed to second mobile unit 2_2 from among record contents stored in storage unit 27 based on the second position information, the second speed information, and the second direction information. As described above, the distribution content is the record content that is stored in information processor 1, and that is distributed to second mobile unit 2_2 and reproduced by second mobile unit 2_2.

How information processor 1 determines the distribution content to be distributed to second mobile unit 2_2 from among record contents will be described in detail later with reference to FIG. 23.

In step S16, information processor 1 generates reproduction speed information specifying reproduction speed of the distribution content based on the second position information, the second speed information, the second direction information, and the distribution content determined in step S15. A method for determining the reproduction speed of the distribution content will be described in detail later with reference to FIG. 23.

In step S17, information processor 1 transmits the distribution content determined in step S15 and the reproduction speed information determined in step S16 to second mobile unit 2_2. As a result, when second mobile unit 2_2 arrives at the same position as the position of first mobile unit 2_1 during recording of the content, second mobile unit 2_2 can reproduce the distribution content of the same scene as that of the record content recorded at the position. Second mobile unit 2_2 also can reproduce the distribution content at a reproduction speed corresponding to its own moving speed.

[Method for Determining Distribution Content and Reproduction Speed]

Next, details of a method for determining the distribution content (corresponding to step S15 in FIG. 22) and a method for determining a reproduction speed of the distribution content (corresponding to step S16 in FIG. 22) in information processor 1 will be described with reference to FIG. 23.

In step S21, information processor 1 extracts the recording position information, which indicates a position of first mobile unit 2_1 during recording where a distance to a current position of second mobile unit 2_2 is less than first threshold value a1, from the recording position information accumulated in storage unit 13. First threshold value a1 has magnitude that is appropriately set by an administrator or the like of information processing system 100, for example. Information processor 1 receives the second position information indicating the current position of second mobile unit 2_2 in step S14 in FIG. 22.

For example, when the current position of second mobile unit 2_2 indicated by the second position information is second point P2 illustrated in FIG. 5, information processor 1 extracts recording position information, in which first mobile unit 2_1 is located at second point P2, from the recording position information stored in storage unit 13.

When the current position of second mobile unit 2_2 indicated by the second position information is between first point P1 and second point P2 illustrated in FIG. 5, information processor 1 extracts recording position information, in which first mobile unit 2_1 is located between first point P1 and second point P2, from the recording position information stored in storage unit 13.

As a result, the recording position information indicating the position of first mobile unit 2_1 that coincides with the current position of second mobile unit 2_2 can be extracted.

Next, in step S22, information processor 1 extracts recording position information associated with a record moving direction indicating a moving direction, in which an angle formed with a current moving direction of second mobile unit 2_2 is less than predetermined second threshold value α2, from the recording position information extracted in step S21. Information processor 1 receives the second direction information indicating a current moving direction of second mobile unit 2_2 in step S14 in FIG. 22.

During movement along the predetermined route, first mobile unit 2_1 and the second mobile unit 2_2 may pass through the same position while facing respective directions that are completely different from each other. In such a case, a landscape viewed from first mobile unit 2_1 and a landscape viewed from second mobile unit 2_2 are completely different from each other. Thus, when the record content recorded by first mobile unit 2_1 is distributed to second mobile unit 2_2 as the distribution content because of the same position, the same experience cannot be shared by a person riding on first mobile unit 2_1 and a person riding on second mobile unit 2_2. In step S22, the recording position information is extracted in which an angle between a moving direction of first mobile unit 2_1 and a moving direction of second mobile unit 2_2 is less than second threshold value α2, and thus recording position information indicating a position that is accidentally identical to a current position of second mobile unit 2_2, and a completely different moving direction, can be excluded.

Next, in step S23, information processor 1 extracts record content associated with the recording position information extracted in step S22 from storage unit 13. For example, when a position of first mobile unit 2_1 indicated by the recording position information extracted in step S22 is second point P2 illustrated in FIG. 5, a series of record contents recorded at second point P2 by first mobile unit 2_1 is extracted. When the position of first mobile unit 2_1 indicated by the recording position information extracted in step S22 is between first point P1 and second point P2, a series of record contents recorded while first mobile unit 2_1 moves from first point P1 to second point P2 are extracted.

Next, in step S24, information processor 1 determines reproduction speed of the record content, which is transmitted to second mobile unit 2_2 and reproduced as distribution content, based on speed of first mobile unit 2_1 indicated by the recording speed information associated with the recording position information extracted in step S22 and speed of second mobile unit 2_2.

A specific example will be described. It is assumed that first mobile unit 2_1 moves from first point P1 to second point P2 illustrated in FIG. 5 at a constant speed of speed V1 while recording record content. Then, it is assumed that second mobile unit 2_2 currently moves from first point P1 to second point P2 at a constant speed of speed V2. In this case, time required for second mobile unit 2_2 to move from first point P1 to second point P2 is V1/V2 times time required for first mobile unit 2_1 to move from first point P1 to second point P2.

When a series of record contents recorded while first mobile unit 2_1 moves from first point P1 to second point P2 is reproduced as distribution content in second mobile unit 2_2, the reproduction is desired to be completed while second mobile unit 2_2 moves from first point P1 to second point P2. For this desire, when reproduction speed of the distribution content in second mobile unit 2_2 is set to V2/V1, the reproduction of the distribution content can be completed while second mobile unit 2_2 moves from first point P1 to second point P2.

When moving speed V2 of second mobile unit 2_2 is smaller than moving speed V1 of first mobile unit 2_1, time required for moving from first point P1 to second point P2 is longer in second mobile unit 2_2 than in first mobile unit 2_1. In such a case, information processor 1 determines the reproduction speed of the distribution content that is slower than that at unity magnification. In contrast, when moving speed V2 of second mobile unit 2_2 is larger than moving speed V1 of first mobile unit 2_1, time required for moving from first point P1 to second point P2 is shorter in second mobile unit 2_2 than in first mobile unit 2_1. In such a case, information processor 1 determines the reproduction speed of the distribution content to be faster than that at unity magnification.

The example has been described above for first mobile unit 2_1 and second mobile unit 2_2, moving at a constant speed. However, when first mobile unit 2_1 and second mobile unit 2_2 do not move at a constant speed, reproduction speed of distribution content can be suitably adjusted using an average value of moving speeds between points, for example.

For a method for changing the reproduction speed in second mobile unit 2_2, a known technique can be used. For distribution content that is a moving image generated for each frame, for example, reproduction speed in second mobile unit 2_2 can be suitably changed by adjusting a frame rate in accordance with reproduction speed determined.

When the distribution content is a moving image or a sound, for example, too high reproduction speed causes a situation in which what is displayed cannot be viewed or what is said cannot be understood. To avoid such a situation, an upper limit of the reproduction speed may be provided in advance.

Figure 22:
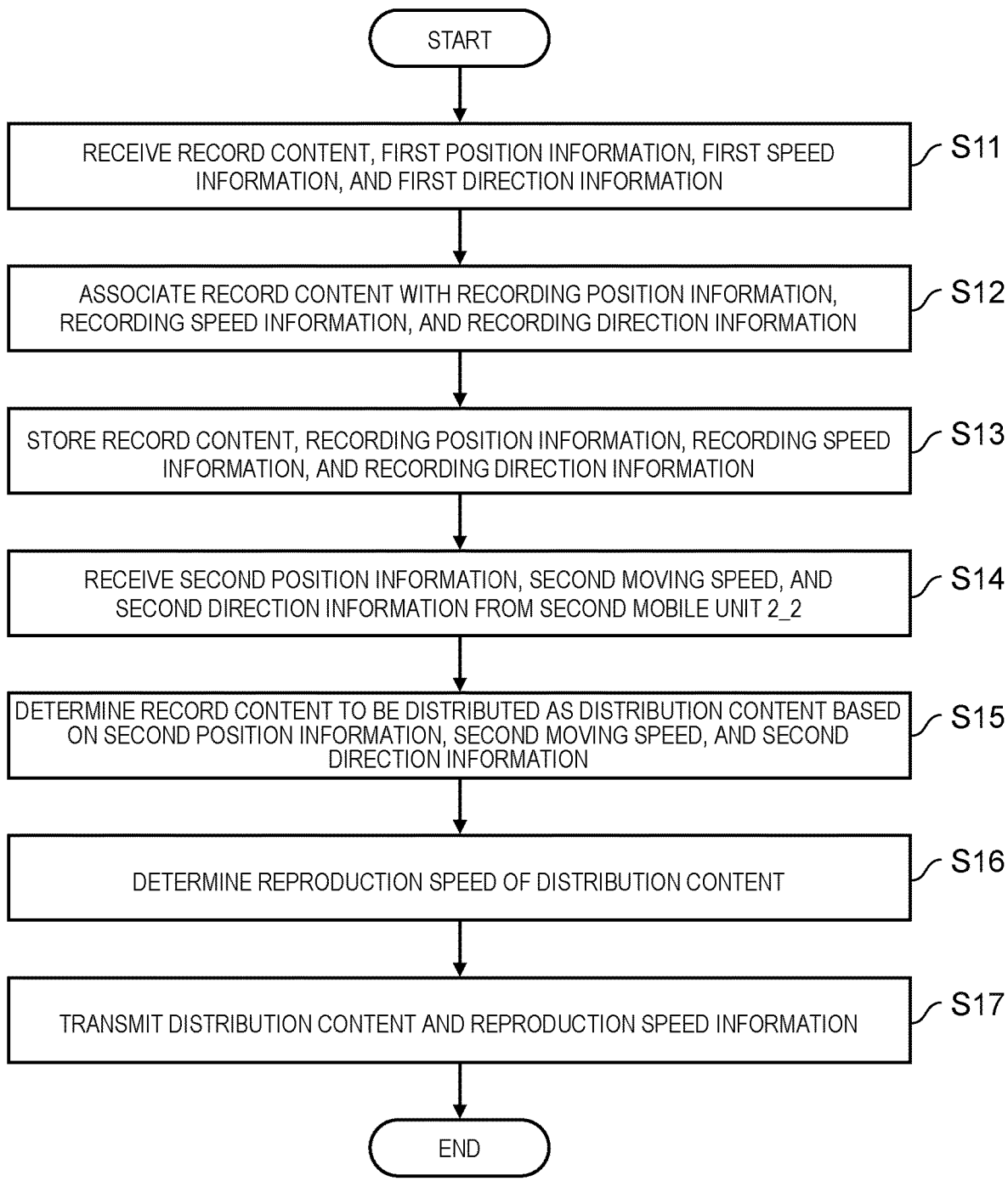
FIG. 22 is a flowchart for illustrating processing performed by an information processor in operation performed by an information processing system.

The distribution content and the reproduction speed information determined to be distributed by information processor 1 as described above are then transmitted to second mobile unit 2_2 in step S17 in FIG. 22.

[Effects]

According to the information processing method, the information processing system, and the information processor of the present disclosure, an experience (record content) when an exhibit is appreciated in one mobile unit in a facility such as an art museum or a museum, for example, can be distributed to another mobile unit as distribution content and the distribution content can be reproduced when another mobile unit arrives in front of the same exhibit. Thus, a person who rides on another mobile unit or moves along with the other mobile unit can share the experience when the exhibit is appreciated in the one mobile unit.

Additionally, according to the information processing method, the information processing system, and the information processor of the present disclosure, reproduction of distribution content in multiple mobile units can be suitably controlled to allow multiple persons to share the same experience. For example, this configuration enables suppressing a situation as follows: when the same content as that of one mobile unit is reproduced at the same timing and at the same reproduction speed in another mobile unit located at a position different from that of the one mobile unit, reproduction of the content may be started before a person riding on the other mobile unit or moving along with the other mobile unit arrives in front of an exhibit, or the reproduction of the content ends in the middle of movement of the other mobile unit; and thus the person riding on the other mobile unit cannot share the same experience with a person riding on the one mobile unit or moving along with the one mobile unit.

Modifications

In the exemplary embodiment described above, an electric wheelchair including a reproduction device has been described as an example of mobile unit 2. However, the mobile unit of the present disclosure may not have a function of moving by itself, and may be a device that can be moved by being carried by a person, for example. Specifically, the mobile unit of the present disclosure may be a mobile terminal device such as a smartphone or a tablet terminal. All of multiple mobile units may be the same type of device, or multiple types of device may be mixed. That is, a mobile unit that records content may be an electric wheelchair, and a mobile terminal device that moves along the same route as the electric wheelchair may reproduce record content recorded by the electric wheelchair as distribution content. Multiple types of device may be mixed in a group of mobile units 2 moving in the same space. For example, record content recorded by the electric wheelchair may be distributed to a following electric wheelchair and a tablet terminal carried by a person moving nearby as distribution content and the distribution content may be reproduced.

Although mobile unit 2 includes both recorder 23 and reproduction device 24 in the exemplary embodiment described above as illustrated in FIG. 3, mobile unit 2 may include any one of recorder 23 and reproduction device 24. In this case, mobile unit 2 serving as a record mobile unit including only recorder 23 and only recording content moves first, and mobile unit 2 serving as a reproduction mobile unit including only reproduction device 24 and only reproducing content moves later.

In the exemplary embodiment described above, an example has been described in which position information acquisition unit 25 acquires position information indicating a position of mobile unit 2 and information processor 1 receives the position information. Alternatively, information processor 1 may directly acquire the position information indicating the position of mobile unit 2. For example, when a camera installed at a specific point captures an image of mobile unit 2, information processor 1 may calculate position information indicating that mobile unit 2 is located at the specific point based on the installation place and an angle of view of the camera. This kind of position information may be calculated by a monitoring system that manages the camera, for example, and information processor 1 may receive the position information indicating the position of mobile unit 2 from the monitoring system. As described above, the position information indicating the position of mobile unit 2 may be acquired or received by information processor 1.

In the exemplary embodiment described above, an example has been described in which speed information acquisition unit 28 acquires speed information indicating moving speed of mobile unit 2 and information processor 1 receives the speed information. Alternatively, information processor 1 may directly acquire the speed information indicating the moving speed of mobile unit 2. For example, information processor 1 generates and acquires the speed information on mobile unit 2 based on a position of mobile unit 2 and a temporal change in position of mobile unit 2. As described above, the speed information indicating the moving speed of mobile unit 2 may be acquired or received by information processor 1.

In the exemplary embodiment described above, an example has been described in which direction information acquisition unit 29 acquires direction information indicating a moving direction of mobile unit 2 and information processor 1 receives the direction information. Alternatively, information processor 1 may directly acquire the direction information indicating the moving direction of mobile unit 2. For example, information processor 1 generates and acquires the direction information on mobile unit 2 based on a position of mobile unit 2 and a temporal change in position of mobile unit 2. As described above, the direction information indicating the moving direction of mobile unit 2 may be acquired or received by information processor 1.

In the exemplary embodiment described above, an example has been described in which multiple mobile units 2 include a head mobile unit and another mobile unit that moves following the head mobile unit. The other mobile unit may move along the exactly same route as the head mobile unit, or may move slightly out of the route within a preset allowable range. In this case, the other mobile unit is allowed to perform autonomous behavior or the like for avoiding a small obstacle or the like, and thus improving safety. When the other mobile unit moves along a route slightly deviated from the moving route of the head mobile unit as described above, distribution content can be suitably reproduced in the other mobile unit by adjusting first threshold value a1 described in step S21 of FIG. 23.

Additionally, when another mobile unit enters a predetermined route from the middle, for example, the distribution content can be reproduced from the middle in the other mobile unit by the following response. In the exemplary embodiment described above, the record content recorded by first mobile unit 2_1 includes time information indicating an elapsed time from a start of recording (step S1 in FIG. 21). The content is associated with the recording position information indicating the position of first mobile unit 2_1 during recording of the content, so that the time information can easily specify a position in the predetermined route at which first mobile unit 2_1 has recorded which part of the record content.

Thus, when second mobile unit 2_2 enters the predetermined route from the middle and is located at a current position indicated by the second position information, which part of the record content has been recorded by first mobile unit 2_1 located at the same position as the current position can be easily specified. As a result, when second mobile unit 2_2 enters the predetermined route from the middle, second mobile unit 2_2 can reproduce the record content recorded by first mobile unit 2_1 from the middle.

In the exemplary embodiment described above, an example has been described in which recording or reproduction of content continues from a start of movement of mobile unit 2 to an end of the movement. Alternatively, mobile unit 2 may move with timing without recording or reproduction of the content. For example, although the present disclosure shows the example illustrated in FIG. 5 in which the content is recorded or reproduced while mobile unit 2 is stopped at second point P2, the present disclosure also includes an aspect in which the content is not recorded or reproduced while mobile unit 2 moves from second point P2 toward third point P3.

In the exemplary embodiment described above, information processor 1 controls mobile unit 2. Alternatively, any one of or all of multiple mobile units 2 may have the function of information processor 1 of the exemplary embodiment described above, for example. In this case, mobile unit 2 having the function of information processor 1 acquires record content and its related data from mobile unit 2 having recorded the content and stores the record content and its related data in association with each other, and then reproduces the record content by itself based on its own position information or the like. Alternatively, mobile unit 2 having the function of information processor 1 distributes the record content to another mobile unit 2 based on position information or the like acquired from the other mobile unit 2. In this case, information processing system 100 does not need to include information processor 1, and information processing system 100 can be reduced in operation cost.

In the exemplary embodiment described above, reproduction of distributed distribution content is controlled by mobile unit 2 having received the distribution content itself. Alternatively, a part or all of the control of reproduction of the distribution content in mobile unit 2 may be performed by information processor 1, for example. Specifically, information processor 1 may determine the following using the position information received from mobile unit 2: which record content is to be reproduced as the distribution content; the number of seconds having elapsed from a start of the record content to a part of the record content to be reproduced; reproduction speed; and the like, and may remotely operate reproduction device 24 provided in mobile unit 2 based on the determined contents.

The present disclosure enables sharing an experience of a person riding on or moving along with a single mobile unit with a person riding on or moving along with another mobile unit.

The present disclosure is useful in a system that records and reproduces content in multiple mobile units.

What is claimed is:

1. An information processing method comprising:
   acquiring record content recorded by a first mobile unit and first position information indicating a position of the first mobile unit while the record content is recorded;
   storing the first position information in association with the record content;
   transmitting a part or all of the record content to a second mobile unit based on a distance between a position of the second mobile unit and the position of the first mobile unit indicated by the first position information, wherein the second mobile unit is configured to reproduce the record content transmitted by the first mobile unit;
   acquiring first speed information indicating a moving speed of the first mobile unit while the record content is recorded; and
   storing the first speed information in association with the record content,
   wherein the transmitting includes changing a reproduction speed of the record content based on a moving speed of the second mobile unit and the moving speed of the first mobile unit indicated by the first speed information, and
   wherein the part or all of the record content has the changed reproduction speed.

2. The information processing method according to claim 1, wherein when the distance is smaller than a first threshold value preset, the transmitting is performed.

3. The information processing method according to claim 1, wherein
   the record content includes recording time information indicating an elapsed time from a start of recording of the record content, the elapsed time corresponding to the position of the first mobile unit indicated by the first position information,
   the transmitting includes determining the elapsed time corresponding to the position of the first mobile unit based on the first position information and the recording time information, and
   wherein the part of the record content transmitted includes the determined elapsed time.

4. The information processing method according to claim 1, further comprising:
   acquiring first direction information indicating a moving direction of the first mobile unit while the record content is recorded; and
   storing the first direction information in association with the record content,
   wherein the transmitting includes calculating an angle formed by a moving direction of the second mobile unit and the moving direction of the first mobile unit indicated by the first direction information, and
   wherein when the angle is smaller than a second threshold value preset, the transmitting is performed.

5. An information processing system comprising:
   a first mobile unit that records record content;
   a second mobile unit; and
   an information processor,
   wherein the information processor
      acquires the record content and first position information indicating a position of the first mobile unit while the record content is recorded,
      stores the first position information in association with the record content, and
      transmits a part or all of the record content to the second mobile unit based on a distance between a position of the second mobile unit and the position of the first mobile unit indicated in the first position information,
   wherein the second mobile unit is configured to reproduce the distribution content transmitted by the first mobile unit,
   wherein the information processor
      acquires first speed information indicating a moving speed of the first mobile unit while the record content is recorded,
      stores the first speed information in association with the record content, and
      changes a reproduction speed of the record content based on a moving speed of the second mobile unit and the moving speed of the first mobile unit indicated by the first speed information, and wherein the part or all of the record content has the changed reproduction speed.

6. The information processing system according to claim 5, wherein the information processor transmits the part or all of the record content to the second mobile unit when the distance is smaller than a first threshold value preset.

7. The information processing system according to claim 5, wherein
the record content includes recording time information indicating an elapsed time from a start of recording of the record content, the elapsed time corresponding to the position of the first mobile unit indicated by the first position information,
the information processor determines the elapsed time corresponding to the position of the first mobile unit based on the first position information and the recording time information, and
the part of the record content transmitted includes the determined elapsed time.

8. The information processing system according to claim 5, wherein
the information processor
acquires first direction information indicating a moving direction of the first mobile unit while the record content is recorded,
stores the first direction information in association with the record content,
calculates an angle formed by a moving direction of the second mobile unit and the moving direction of the first mobile unit indicated by the first direction information, and
transmits the part or all of the record content to the second mobile unit when the angle is smaller than a second threshold value preset.

9. An information processor comprising:
a processor; and
a memory,
the processor having a function of executing procedures using a program recorded in the memory, the procedures including:
acquiring record content recorded by a first mobile unit and first position information indicating a position of the first mobile unit while the record content is recorded;
storing the first position information in association with the record content;
transmitting a part or all of the record content to a second mobile unit based on a distance between a position of the second mobile unit and the position of the first mobile unit indicated in the first position information,
acquiring first speed information indicating a moving speed of the first mobile unit while the record content is recorded; and
storing the first speed information in association with the record content,
wherein the transmitting includes changing a reproduction speed of the record content based on a moving speed of the second mobile unit and the moving speed of the first mobile unit indicated by the first speed information,
wherein the part or all of the record content has the changed reproduction speed, and
wherein the second mobile unit is configured to reproduce the distribution content transmitted by the first mobile unit.

10. The information processor according to claim 9, wherein when the distance is smaller than a first threshold value preset, the transmitting is performed.

11. The information processor according to claim 9, wherein
the record content includes recording time information indicating an elapsed time from a start of recording of the record content, the elapsed time corresponding to the position of the first mobile unit indicated by the first position information,
the transmitting includes determining the elapsed time corresponding to the position of the first mobile unit based on the first position information and the recording time information, and
the part of the record content transmitted includes the determined elapsed time.

12. The information processor according to claim 9, wherein
the processor further has functions of executing procedures, the procedures including:
acquiring first direction information indicating a moving direction of the first mobile unit while the record content is recorded; and
storing the first direction information in association with the record content,
the transmitting includes calculating an angle formed by a moving direction of the second mobile unit and the moving direction of the first mobile unit indicated by the first direction information, and
when the angle is smaller than a second threshold value preset, the transmitting is performed.

* * * * *